(12) United States Patent
Yamawaki

(10) Patent No.: US 6,687,198 B2
(45) Date of Patent: Feb. 3, 2004

(54) INFORMATION ACCESS DEVICE, INFORMATION ACCESS METHOD, AND INFORMATION STORAGE MEDIUM ACCESS SYSTEM

(75) Inventor: Masashi Yamawaki, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 85 days.

(21) Appl. No.: 09/975,151

(22) Filed: Oct. 12, 2001

(65) Prior Publication Data

US 2002/0172103 A1 Nov. 21, 2002

(30) Foreign Application Priority Data

May 17, 2001 (JP) ......................... 2001-147487

(51) Int. Cl.$^7$ ............................................. G11B 21/108

(52) U.S. Cl. ................. 369/30.11; 369/47.1; 369/53.41

(58) Field of Search ............................ 369/30.11, 30.01, 369/30.03, 30.09, 30.12, 47.14, 47.18, 47.1, 47.15, 53.41, 53.15, 53.27, 53.12, 53.17, 30.23, 47.54, 53.29

(56) References Cited

U.S. PATENT DOCUMENTS 6,160,776 A * 12/2000 Seo ........................... 369/47.1
6,522,608 B1 * 2/2003 Kuroda .................... 369/47.28

* cited by examiner

Primary Examiner—Ali Neyzari
(74) Attorney, Agent, or Firm—Arent Fox Kintner Plotkin & Kahn, PLLC

(57) ABSTRACT

In an information access device, an information access method and an information storage medium access system which are suited to quickly and reliably detect a deviation in frame management associated with erroneous detection of a synchronous mark and to perform an operation of redetecting a synchronous mark, an Even synchronous mark erroneous detector outputs a count-up signal if a synchronous mark LSY from an LPP pattern comparing portion is "111" when an Even/Odd identification signal from a frame counter assumes 1. An Odd synchronous mark erroneous detector outputs a count-up signal if the synchronous mark LSY is "110" when the Even/Odd identification signal assumes 0. An erroneous detection counter counts the number of the outputted count-up signals, which is compared with a count value set by a redetection level portion in a comparator. Then a redetection instruction signal for redetecting an LPP access synchronous mark is outputted.

37 Claims, 20 Drawing Sheets

CIRCUIT BLOCK DIAGRAM OF AN LPP ACCESS PORTION ACCORDING TO FIRST EMBODIMENT

FIG.1 CIRCUIT BLOCK DIAGRAM OF AN LPP ACCESS PORTION ACCORDING TO FIRST EMBODIMENT

FIG.3 CIRCUIT BLOCK DIAGRAM OF AN LPP ACCESS PORTION ACCORDING TO SECOND EMBODIMENT

FIG.4 CIRCUIT BLOCK DIAGRAM OF A SYNCHRONOUS MARK ERRONEOUS DETECTION COUNTER PORTION ACCORDING TO SECOND EMBODIMENT

FIG.5 CIRCUIT BLOCK DIAGRAM OF AN LPP ACCESS PORTION ACCORDING TO THIRD EMBODIMENT

FIG. 6 CIRCUIT BLOCK DIAGRAM OF A DATA LACK DETECTING PORTION ACCORDING TO FIRST CONCRETE EXAMPLE OF THIRD EMBODIMENT

FIG.7 CIRCUIT BLOCK DIAGRAM OF A DATA LACK DETECTING PORTION ACCORDING TO SECOND CONCRETE EXAMPLE OF THIRD EMBODIMENT

FIG.9 CIRCUIT BLOCK DIAGRAM OF AN LPP ACCESS PORTION ACCORDING TO FOURTH EMBODIMENT

FIG.10 CIRCUIT BLOCK DIAGRAM OF A DATA DUALITY DETECTING PORTON ACCORDING TO FIRST CONCRETE EXAMPLE OF FOURTH EMBODIMENT

FIG.12 CIRCUIT BLOCK DIAGRAM OF AN LPP ACCESS PORTION ACCORDING TO FIFTH EMBODIMENT

FIG.15

BIT CONFIGURATION DIAGRAM PER DATA SECTOR OF THE LPP

| BIT | CONTENTS |
|-----|----------|
| 1 | SYNCHRONOUS MARK |
| 2 | RELATIVE ADDRESS 3 |
| 3 | RELATIVE ADDRESS 2 |
| 4 | RELATIVE ADDRESS 1 |
| 5 | RELATIVE ADDRESS 0 |
| 6 | DATA 7 |
| 7 | DATA 6 |
| 8 | DATA 5 |
| 9 | DATA 4 |
| 10 | DATA 3 |
| 11 | DATA 2 |
| 12 | DATA 1 |
| 13 | DATA 0 |

Bits 6-13: OBJECT FOR ECC

FIG.16

DATA CONFIGURATION DIAGRAM PER DATA BLOCK OF THE LPP

| SECTOR \ BIT | 1 | ADDRESS | | | | DATA | | | | | | | |
|---|---|---|---|---|---|---|---|---|---|---|---|---|---|
| | | 2 | 3 | 4 | 5 | 6 | 7 | 8 | 9 | 10 | 11 | 12 | 13 |
| 1 | LSY | 0 | 0 | 0 | 0 | DATA | | | | | | | |
| 2 | LSY | 0 | 0 | 0 | 1 | DATA | | | | | | | |
| 3 | LSY | 0 | 0 | 1 | 0 | DATA | | | | | | | |
| 4 | LSY | 0 | 0 | 1 | 1 | DATA | | | | | | | |
| 5 | LSY | 0 | 1 | 0 | 0 | DATA | | | | | | | |
| 6 | LSY | 0 | 1 | 0 | 1 | DATA | | | | | | | |
| 7 | LSY | 0 | 1 | 1 | 0 | DATA | | | | | | | |
| 8 | LSY | 0 | 1 | 1 | 1 | DATA | | | | | | | |
| 9 | LSY | 1 | 0 | 0 | 0 | DATA | | | | | | | |
| 10 | LSY | 1 | 0 | 0 | 1 | DATA | | | | | | | |
| 11 | LSY | 1 | 0 | 1 | 0 | DATA | | | | | | | |
| 12 | LSY | 1 | 0 | 1 | 1 | DATA | | | | | | | |
| 13 | LSY | 1 | 1 | 0 | 0 | DATA | | | | | | | |
| 14 | LSY | 1 | 1 | 0 | 1 | DATA | | | | | | | |
| 15 | LSY | 1 | 1 | 1 | 0 | DATA | | | | | | | |
| 16 | LSY | 1 | 1 | 1 | 1 | DATA | | | | | | | |

(SYNCHRONOUS MARK)

FIG.17 CONCEPTUAL VIEW OF A TRACK FORMAT ON ONE DATA SECTOR

CIRCUIT BLOCK DIAGRAM OF AN LPP ACCESS PORTION ACCORDING TO THE RELATED ART

INFORMATION ACCESS DEVICE, INFORMATION ACCESS METHOD, AND INFORMATION STORAGE MEDIUM ACCESS SYSTEM

BACKGROUND OF THE INVENTION

1. Field of the Invention

The invention relates to access of information stored on an information storage medium such as a DVD (Digital Versatile Disc) or the like, and more particularly to access of control information such as synchronous signals, address information or the like.

2. Description of Related Art

Among bulk information storage media typified by DVD, on a DVD-R (DVD-Recordable) into which information can be written or a DVD-RW (DVD-ReWritable) in which information is rewritable, information is stored using groove tracks as information storage tracks. The groove track is interposed between land tracks, which are guide tracks for guiding a light source such as a laser beam or the like. When viewed from the light source, the groove tracks and the land tracks form convex portions and concave portions respectively. That is, the convex-concave tracks are formed along the circumference of an optical disk.

Furthermore, information on the attribute of stored information and information for attaining synchronization of data frames as a unit of stored information are stored as control information. This information is arranged on the land tracks which are not designed to store information, and is referred to as Land Pre Pit (hereinafter described as LPP) information.

In information storage media such as DVD-R, DVD-RW or the like, an information group of two kilo-bytes is configured as one data sector, and LPP information has a bit configuration with 13 bits as a unit for each data sector. FIG. 15 shows a bit configuration per data sector of LPP information. This is a configuration where a synchronous mark LSY is stored as the first bit of LPP information, where address bits indicating addresses among data sectors (hereinafter referred to as relative addresses) (Relative Addresses 3 to 0) are stored as the second to fifth bits of LPP information, and where data bits (Data 7 to 0) are stored as the sixth to thirteenth bits of LPP information. A one-bit-width synchronous mark LSY arranged at the head of a sector differs depending on differences among later-described 26 data frames (see FIG. 17) into which one data sector is divided. To be more specific, the data frames are numbered from 0. The data frames of even numbers are classified into an Even region, whereas the data frames of odd numbers are classified into an Odd region. In this instance, a synchronous mark LSY of "111" channel bits is set in the case of arrangement in a frame in the Even region, and a synchronous mark LSY of "110" channel bits is set in the case of arrangement in a frame in the Odd region. The synchronous mark LSY attains synchronization among sectors and determines whether a certain one of the frames belongs to the Even region or to the Odd region. Data are stored in all of the following 12 bits as "0" or "1". On the medium, while bits "0" are denoted by "100" channel bits, bits "1" are denoted by "101" channel bits. The relative addresses of four bits, i.e. the second to fifth bits in the former half define the sequence of the sectors. Namely, as shown in FIG. 16, one data block is configured by taking together first to sixteenth sectors that have been identified continuously according to an ascending sequence as the addresses "0000" to "1111". Parity and block addresses for error correction codes (ECC) are allocated to the other eight data bits, i.e. the sixth to thirteenth bits. One data block is divided into some sectors, and errors are detected and corrected as to data bit strings detected from a predetermined number of the sectors. As for bit strings of LPP information detected on the basis of a synchronous mark LSY, if consecutiveness of the relative addresses of four bits among the data sectors is confirmed and if it can be confirmed that the data bit strings are read out correctly owing to detection and correction of errors of the data bit strings in the predetermined number of sectors, it is concluded that access to LPP information has been made accurately. Thus, the readout state is locked.

FIG. 17 shows a track format of one data sector. As described above, one sector is divided into 26 data frames, which are numbered from 0. The frames of even numbers are classified into the Even region, whereas the frames of odd numbers are classified into the Odd region. Basically, LPP information is arranged bit by bit in the frames in the Even region. That is to say, a synchronous mark LSY is arranged in the zeroth frame, address bits are arranged in the second, fourth, sixth and eighth frames, and data bits are arranged in the tenth, twelfth, fourteenth, sixteenth, eighteenth, twentieth, twenty-second and twenty-fourth frames. On the other hand, the Odd region is secured as a spare data frame region. That is to say, the first frame is secured as a spare region for the synchronous mark LSY in the zeroth frame, the third, fifth, seventh and ninth frames are secured as spare regions for the address bits in the second, fourth, sixth and eighth frames respectively, and the eleventh, thirteenth, fifteenth, seventeenth, nineteenth, twenty-first, twenty-third and twenty-fifth frames are secured as spare regions for the data bits in the tenth, twelfth, fourteenth, sixteenth, eighteenth, twentieth, twenty-second and twenty-fourth frames respectively.

FIG. 18 shows a case where LPP information of the above track format is arranged on an information storage medium such as an optical disk or the like. LPP information is arranged on land tracks coincident with frame head positions of groove tracks on which information is stored. By irradiating the groove tracks formed along the circumference of the medium with light such as laser beams emitted from a light source, the information stored on the groove tracks is read out. At this moment, the spot radius of the light source is set greater than the width of the groove tracks so that some of the land tracks are also irradiated. Due to this configuration, the LPP information arranged on the land tracks is read out. LPP information is basically attached to each one of the data frames in the Even region and thus is arranged repeatedly at a pitch corresponding to two of the data frames on the disk. This arrangement is continuously repeated toward the center of the disk. Therefore, there is a fear that pieces of LPP information on two of the adjacent land tracks between which a corresponding one of the groove tracks is interposed may adjoin each other while overlapping with each other in a scanning direction of the light source. This hampers accurate read-out of LPP information. Thus, in general, in the case where pieces of LPP information overlap with each other, one of them is transferred to the Odd region, i.e. to an adjacent data frame. In this case, if the number of the data frame in the Odd region to which that piece of LPP information has been transferred is set as a number which is greater by one than the number of the data frame in the Even region to which that piece of information belongs intrinsically so that the Odd region is configured as a spare region for the Even region, those pieces of information can be prevented from overlapping with each other on the disk.

FIG. 19 shows an LPP access portion 1000 of the related art. Three-channel-bit LPP information read out by a light source is inputted to a three-channel-bit shift register 101. An LPP pattern comparing portion 102 subjects the LPP information inputted from the shift register 101 to comparison and finds out whether the LPP information coincides with "111" channel bits as a synchronous mark in the Even region, "110" channel bits as a synchronous mark in the Odd region, "100" channel bits indicating a data bit "0", or "101" channel bits indicating "1". If the LPP information coincides with a synchronous mark LSY, the LPP pattern comparing portion 102 outputs the synchronous mark LSY to a synchronous mark detecting portion 103. If the LPP information coincides with data bits, the LPP pattern comparing portion 102 outputs a data bit signal La/Ld indicating an address or data to a data detecting portion 105.

If a synchronous mark LSY is inputted to the synchronous mark detecting portion 103 from the LPP pattern comparing portion 102, the synchronous mark detecting portion 103 determines whether the inputted synchronous mark LSY is a synchronous mark "111" in a data frame in the Even region or a synchronous mark "110" in a data frame in the Odd region, and outputs a detection pulse SY. At the same time, the synchronous mark detecting portion 103 sets an initial counter value for a frame counter 106, which will be described later. That is, the counter initial value is set as 0 if the synchronous mark "111" corresponding to the Even region is detected, whereas the counter initial value is set as 1 if the synchronous mark "110" corresponding to the Odd region is detected.

Further, a least significant bit of the frame counter 106 is inputted to the synchronous mark detecting portion 103 as an Even/Odd identification signal F0. In one of data sector cycles following a cycle subsequent to detection of a synchronous mark, the synchronous mark detecting portion 103 detects the Even/Odd identification signal F0 and the synchronous mark LSY detected by the LPP pattern comparing portion 102. This is because of the necessity to adjust a count value of a later-described frame length counter 107 by a signal (not shown), change a count-up timing for the frame counter 106 and adjust a timing for detection in a subsequent data sector cycle for the purpose of fine adjustment of errors or the like in rotation control of an information storage medium such as a DVD-R or the like during access thereof.

The data detecting portion 105 demodulates the inputted three-channel-bit data bit signal La/Ld and outputs demodulated data Add/Data of "0" and "1". The demodulated data Add/Data thus outputted are inputted to an address/data storage register 109.

The frame counter 106 counts data frame numbers 0 to 25 by enable signals transmitted to an enable terminal E. In the track format in one data sector shown in FIG. 17, the data frame number 0 indicates data frames in the Even region which are among the synchronous mark data frames and in which the synchronous mark "111" is stored. The data frame number 1 indicates data frames in the Odd region which are among the synchronous mark data frames and in which the synchronous mark "110" is stored. These data frame numbers 0 and 1 are outputted to the synchronous mark detecting portion 103 as an Even/Odd identification signal F0. Further, the data frame numbers 2 to 9 indicate data frames for four-bit relative addresses. These data frames are numbered with two data frames in the Even/Odd regions constituting one-bit storage region for each bit. Furthermore, the data frame numbers 10 to 25 indicate data frames for eight-bit data. These data frames are numbered with two data frames in the Even/Odd regions constituting one-bit storage region for each bit. Then the data frame numbers 2 and 25 are outputted to the data detecting portion 105 as address/data position signals FA/D.

The frame length counter 107 counts the number of clocks constituting frames by an enable signal transmitted to the enable terminal E and determines a count-up timing for the frame counter 106 by a count-up signal C.

The enable signal transmitted to the enable terminals E of the frame counter 106 and the frame length counter 107 is an output signal Q from a set-reset flip-flop (SRFF) 108. A detection signal SY from the synchronous mark detecting portion 103 is inputted to a set input S of the SRFF 108, whereas a reset signal RST is inputted to a reset input R of the SRFF 108.

Further, if a synchronous mark "111" is detected, it is determined that the synchronous mark "111" has been detected in a data frame in the Even region, and the initial count value of the frame counter 106 must be set as 0 (F1=0). If a synchronous mark "110" is detected, it is determined that the synchronous mark "110" has been detected in a data frame in the Odd region, and the initial count value of the frame counter 106 must be set as 1 (F0=1). This initial count value is set by a signal (not shown) from the synchronous mark detecting portion 103. Namely, if a synchronous mark LSY from the LPP pattern comparing portion 102 is detected, the initial value of the frame counter 106 is set as 0 (F0=0) in the case of detection of "111" and is set as 1 (F0=1) in the case of detection of "110". In this manner, the data frames in which inputted LPP information is stored are made to conform to the frame counter values.

Further, in the case of a DVD-R, one data frame is configured of eight cycles of wobbling signals each of which consists of 186 bits. Thus, the frame length counter 107 is configured with its basic count value being 186×8=1488. In fact, the above basic count value may cause deviation due to errors or the like in rotation control of an information storage medium such as a DVD-R or the like during access thereof. For this reason, a detection result of comparison between an Even/Odd identification signal F0 and a synchronous mark LSY detected in one of the data sector cycles following a cycle subsequent to detection of a synchronous mark from the synchronous mark detecting portion 103 is inputted as a signal (not shown) for fine adjustment of errors or the like. Thus, the count value is finely adjusted and a timing for detection in the subsequent data sector cycle is adjusted.

An operation of access LPP information will now be described with reference to FIG. 19. First of all, an initialized state in which a reset signal RST and the like have been inputted is realized. The SRFF 108 is in a reset state. A disable signal is inputted to the enable terminals E of the frame counter 106 and the frame length counter 107, and the counters 106, 107 have been reset and are out of operation. In this state, the LPP access portion 1000 is in a state of free-run. The Even/Odd identification signal F0 from the frame counter 106 has been initialized (F0=0), and the synchronous mark detecting portion 103 has been waiting to detect a synchronous mark "111" or "110".

If a synchronous mark is detected by the LPP pattern comparing portion 102 with the frame counter 106 initialized, the synchronous mark detecting portion 103 sets the Even/Odd identification signal F0 at its initialized state in accordance with a signal from the synchronous mark detecting portion 103. That is, if a synchronous mark "111"

is detected by the synchronous mark detecting portion 103, it is identified as a synchronous mark LSY in a data frame in the Even region, whereas if a synchronous mark "110" is detected by the synchronous mark detecting portion 103, it is identified as a synchronous mark LSY in a data frame in the Odd region. The count value of the frame counter 106 is initialized to 0 (F0=0) for a synchronous mark "111" in the Even region, and to 1 (F0=1) for a synchronous mark "110" in the Odd region.

Then a detection pulse SY is outputted, the SRFF 108 is set, and an output signal Q is outputted. The frame counter 106 and the frame length counter 107 are activated by the output signal Q. That is, if the frame length counter 107 reaches a count value corresponding to the length of one frame, i.e. if the timing for counting up has come, a count-up signal C is outputted to the frame counter 106 so that the count value of the frame counter 106 is incremented by one. The counting of 26 data frames constituting one data sector is carried out using count values of 0 to 25. The count value returns to 0 after having reached 25, and the same counting operation is repeated as to data frames in a subsequent data frame.

If operation of the frame counter 106 is finished, count values 2 to 25 as address/data position signals FA/D are outputted to a data detecting portion 105 and the address/data storage register 109. The data detecting portion 105 demodulates data in accordance with the address/data position signal FA/D, recognizes a data frame position to which the demodulated address belongs or the demodulated data belong, and also finds out whether the data frame is in the Even region or in the Odd region by referring to a data frame number. The demodulated address/data Add/Data is/are stored in the address/data storage register 109. It is then concluded through detection and correction of errors of the data and consecutiveness of the address that access to LPP information has been made. Thus, the following processes of access data are performed while securing a lock state.

Although LPP information is basically arranged in the frames in the Even region, it is preliminarily arranged in the frames in the Odd region only in the aforementioned case. Thus, in order to accurately reproduce 13-bit LPP information stored in one sector, it is important to carry out frame management based on correct detection of a synchronous mark LSY arranged in the first frame, including a clear distinction about whether the synchronous mark LSY is arranged in a frame in the Even region or in a frame in the Odd region. According to the related art, access to LPP information is made based on confirmation of consecutiveness of relative addresses and detection and correction of errors of data bits.

However, while LPP information is basically stored in the frames in the Even region which are arranged alternately with the frames in the Odd region, there may be some cases where LPP information is also stored preliminarily in some of the frames in the Odd region. Thus, if the type of a frame to which a synchronous mark LSY belongs is erroneously detected as the opposite type, an operation of access by the LPP access portion 1000 is performed normally with frames to be detected being deviant. This causes a fear that the existence of a lock state may be recognized. To be more specific, a synchronous mark "111" in the Even region may erroneously be detected as "110", or a synchronous mark "110" in the Odd region may erroneously be detected as "111". In both cases, the Even/Odd regions on the medium are reversely recognized by the LPP access portion 1000 as the Odd/Even regions. Also in this case, if "111" is erroneously detected as "110" for instance, LPP information in the Even region is detected as information in the Odd region. This causes a fear that apparent correctness in access of LPP information may be concluded as long as the LPP information is arranged in the Even region of the medium. The problem is that this deviation remains undetected until the LPP information on the medium is arranged in the Odd region.

Further, if LPP information is arranged in the Odd region on the medium, lack of LPP information in a specific one of the frames, dual access of LPP information in both the Even/Odd regions, or the like occurs. However, if access to LPP information cannot be made correctly because of the characteristics of the circuit configuration or the like of the LPP access portion 1000, a specific data value may be set as a default value. If this default value assumes a certain value, it is possible that the conditions for consecutiveness of relative addresses and detection and correction of errors of data bits may be satisfied, and that the data bits may be modified through the function of error correction. Therefore it is conceivable that detection of a deviation in access will take unnecessarily long. This causes a problem of the incapability to ensure good response and reliability in access LPP information.

Erroneous detection of the synchronous mark LSY mentioned above will be described in detail with reference to a concrete example shown in FIG. 20. FIG. 20 shows a case where a synchronous mark LSY of "111" channel bits in a frame in the Even region is detected as "110" channel bits. If a synchronous mark "111" is erroneously detected as "110" in a frame 0 in the Even region on the medium, it is erroneously recognized that the synchronous mark LSY has been confirmed in a frame in the Odd region. The count value of the frame counter 106 is preset as 1 and then incremented stepwise. Namely, the frame number managed by the frame counter 106 is greater by one than the number of a corresponding one of actual frames on the medium. This means an inverted relation between the Even and Odd regions.

An operation of detecting data is performed in accordance with the frame counter 106. Therefore, when a relative address 3 in the Even region is searched for with a count value 2 that has been incremented by one, the frame 1 in the Odd region on the medium is actually searched for. Because data and the like are basically arranged in the Even region, neither "100" indicating a bit "0" nor "101" indicating a bit "1" can be found. Thus, the count value of the frame counter 106 is again incremented by one and set as 3 so as to make a search in the Odd region. In this manner, the frame 2 in the Even region on the medium is actually detected. Because the relative address 3 is arranged in this region, the corresponding address bit is detected. The same operation is repeated thereafter.

Information that is intrinsically to be detected as LPP information in a frame in the Even region is erroneously found out in the Odd region. Also in this case, if original data are in the Even region, they can be detected as the same LPP information even with deviation of a detecting position to the Odd region. As a result, relative addresses can maintain consecutiveness thereof, and data bits are detected as normal bits. Thus, access to LPP information is made apparently correctly.

On the other hand, if a specific piece of LPP information is arranged in the Odd region on the medium (in the case of a frame 15 in FIG. 20A), data which are to be detected as data in the Odd region do not exist due to an instruction from the frame counter 106 (in the case of the frame counter value of 15 in FIG. 20B), and one-bit LPP information that is to be retrieved with a combination of the Even and Odd regions drops out (in the case of the frame counter value of 14 or 15 in FIG. 20B). To the contrary, if the frame counter value then assumes 16 and 17, LPP information data in the Odd region on the medium (the frame 15 shown in FIG. 20A) and LPP information data in the next frame in the Even region (the frame 16 shown in FIG. 20A) are read out. That is, two-bit LPP information is dually retrieved in two frames in the Even/Odd regions from which one-bit LPP information is to be retrieved. In this case, although the LPP access portion 1000 cannot detect LPP information correctly, there may be a case where access to LPP information is made apparently correctly if the aforementioned default value is set.

SUMMARY OF THE INVENTION

The invention has been made to solve the above problems of the related art. It is an object of the invention to provide an information access device, information access method and an information storage medium access system which can accurately reproduce a control information string by quickly and reliably detecting a deviation in frame management associated with erroneous detection of a synchronous mark and redetecting a synchronous mark when access control information on an information storage medium.

To achieve the above object, according to one aspect of the invention, there is provided an information access device that detects control information units at a synchronized timing based on detection of a specific control information unit included in a control information string when access the control information string that is added to an information unit composed of a predetermined number of data frame groups on an information storage medium and that has the control information units divided as basic units and stored in unit storage regions in which one of the data frames is a storage region and in which one or more of the other data frames are spare data frames for a spare region, wherein the control information unit includes a predetermined control information unit stored at a position of a predetermined one of the data frames in the data frame group, wherein the information access device comprises a setting portion for setting a corresponding identifier for each of the data frames on the basis of the data frame in which the specific control information unit is stored, and a discordance detecting portion for detecting that the identifier in which the predetermined control information unit is detected does not correspond to the position of the predetermined one of the data frames, and wherein redetection of the specific control information unit is carried out based on an output from the discordance detecting portion.

Further, according to one aspect of the invention, there is provided an information access method in which control information units are detected at a synchronized timing based on detection of a specific control information unit included in a control information string when access the control information string that is added to an information unit composed of a predetermined number of data frame groups on an information storage medium and that has the control information units divided as basic units and stored in unit storage regions in which one of the data frames is a storage region and in which one or more of the other data frames are spare data frames for a spare region, wherein the control information unit includes a predetermined control information unit stored at a position of a predetermined one of the data frames in the data frame group, wherein the information access method comprises a setting step for setting a corresponding identifier for each of the data frames on the basis of the data frame in which the specific control information unit is stored, and a discordance detecting step for detecting that the identifier in which the predetermined control information unit is detected does not correspond to the position of the predetermined one of the data frames, and wherein redetection of the specific control information unit is carried out based on an output from the discordance detecting step.

Further, according to one aspect of the invention, there is provided an information storage medium access system comprising a control information access portion that detects control information units at a synchronized timing based on detection of a specific control information unit included in a control information string when access the control information string that is added to an information unit composed of a predetermined number of data frame groups on an information storage medium and that has the control information units divided as basic units and stored in unit storage regions in which one of the data frames is a storage region and in which one or more of the other data frames are spare data frames for a spare region, wherein the control information unit includes a predetermined control information unit stored at a position of a predetermined one of the data frames in the data frame group, wherein the control information access portion comprises a setting portion for setting a corresponding identifier for each of the data frames on the basis of the data frame in which the specific control information unit is stored, and a discordance detecting portion for detecting that the identifier in which the predetermined control information unit is detected does not correspond to the position of the predetermined one of the data frames, and wherein redetection of the specific control information unit is carried out based on an output from the discordance detecting portion.

In the information access device, the information access method and the information storage medium access system, the setting portion sets a corresponding identifier for each of the data frames on the basis of the data frame in which the specific control information unit is stored, and the discordance detecting portion detects that the identifier in which the predetermined control information unit is detected does not correspond to the position of the predetermined one of the data frames. Redetection of the specific control information unit is carried out based on an output from the discordance detecting portion.

Thereby the corresponding identifier for each of the data frames is set on the basis of the data frame in which the specific control information unit is stored. Therefore, if an identifier is detected for the predetermined control information unit stored at a position of a predetermined one of the data frames in the data frame groups, it can be confirmed whether or not the predetermined control information unit has been detected at a proper data frame position. When detecting control information units stored in the unit storage regions including the spare data frame and access a control information string, even if an access operation is erroneously performed with a synchronized timing associated with erroneous detection of the specific control information unit being deviant from the data frames in which the control information units are stored, access of a control information string can be made accurately by quickly and reliably detecting a deviation in frame management and performing an access operation of a specific control information unit. Thus, recuperation from the deviation in frame management is accelerated and a considerable contribution to enhancement of TAT in access of LPP information is made.

Further, according to another aspect of the invention, there is provided an information access device that detects control information units at a synchronized timing based on detection of a specific control information unit included in a control information string when access the control information string that is added to an information unit composed of a predetermined number of data frame groups on an information storage medium and that has the control information units divided as basic units and stored in unit storage regions in which one of the data frames is a storage region and in which one or more of the other data frames are spare data frames for a spare region, wherein the information access device comprises a setting portion for setting a corresponding identifier for each of the data frames on the basis of the data frame in which the specific control information unit is stored, and a discordance detecting portion for detecting discordance unless the control information units are detected in one-to-one relation to each of the unit storage regions including the data frame corresponding to the identifier, and wherein redetection of the specific control information unit is carried out based on an output from the discordance detecting portion.

Further, according to another aspect of the invention, there is provided an information access method in which control information units are detected at a synchronized timing based on detection of a specific control information unit included in a control information string when access the control information string that is added to an information unit composed of a predetermined number of data frame groups on an information storage medium and that has the control information units divided as basic units and stored in unit storage regions in which one of the data frames is a storage region and in which one or more of the other data frames are spare data frames for a spare region, wherein the information access method comprises a setting step for setting a corresponding identifier for each of the data frames on the basis of the data frame in which the specific control information unit is stored, and a discordance detecting step for detecting discordance unless the control information units are detected in one-to-one relation to each of the unit storage regions including the data frame corresponding to the identifier, and wherein redetection of the specific control information unit is carried out based on an output from the discordance detecting step.

Further, according to another aspect of the invention, there is provided an information storage medium access system comprising a control information access portion that detects control information units at a synchronized timing based on detection of a specific control information unit included in a control information string when access the control information string that is added to an information unit composed of a predetermined number of data frame groups on an information storage medium and that has the control information units divided as basic units and stored in unit storage regions in which one of the data frames is a storage region and in which one or more of the other data frames are spare data frames for a spare region, wherein the control information access portion comprises a setting portion for setting a corresponding identifier for each of the data frames on the basis of the data frame in which the specific control information unit is stored, and a discordance detecting portion for detecting discordance unless the control information units are detected in one-to-one relation to each of the unit storage regions including the data frame corresponding to the identifier, and wherein redetection of the specific control information unit is carried out based on an output from the discordance detecting portion.

In the information access device, the information access method and the information storage medium access system, the setting portion sets a corresponding identifier for each of the data frames on the basis of the data frame in which the specific control information unit is stored, and the discordance detecting portion detects that the control information units are not detected in one-to-one relation to each of the unit storage regions including the data frame corresponding to the identifier. Redetection of the specific control information unit is carried out based on an output from the discordance detecting portion.

Thereby the control information units are stored in one of the unit storage regions. Therefore, a deviation in frame management can be confirmed if a relation between the detected control information unit and the unit storage regions is confirmed by the identifier corresponding to the control information unit.

Further, since this confirmation can be carried out through detection between adjacent control information units, it is possible to quickly and reliably confirm a deviation in frame management and accurately reproduce a control information string. Thus, recuperation from the deviation in frame management is accelerated and a considerable contribution to enhancement of TAT in access of a control information string is made.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

BRIEF DESCRIPTION OF THE DRAWINGS

FIG. 15 is a bit configuration diagram per data sector of the LPP.

FIG. 16 is a data configuration diagram per data block of the LPP.

FIG. 20 is an illustrative view of erroneous detection of a synchronous mark.

DETAILED DESCRIPTION OF PREFERRED EMBODIMENTS

Figure 1:
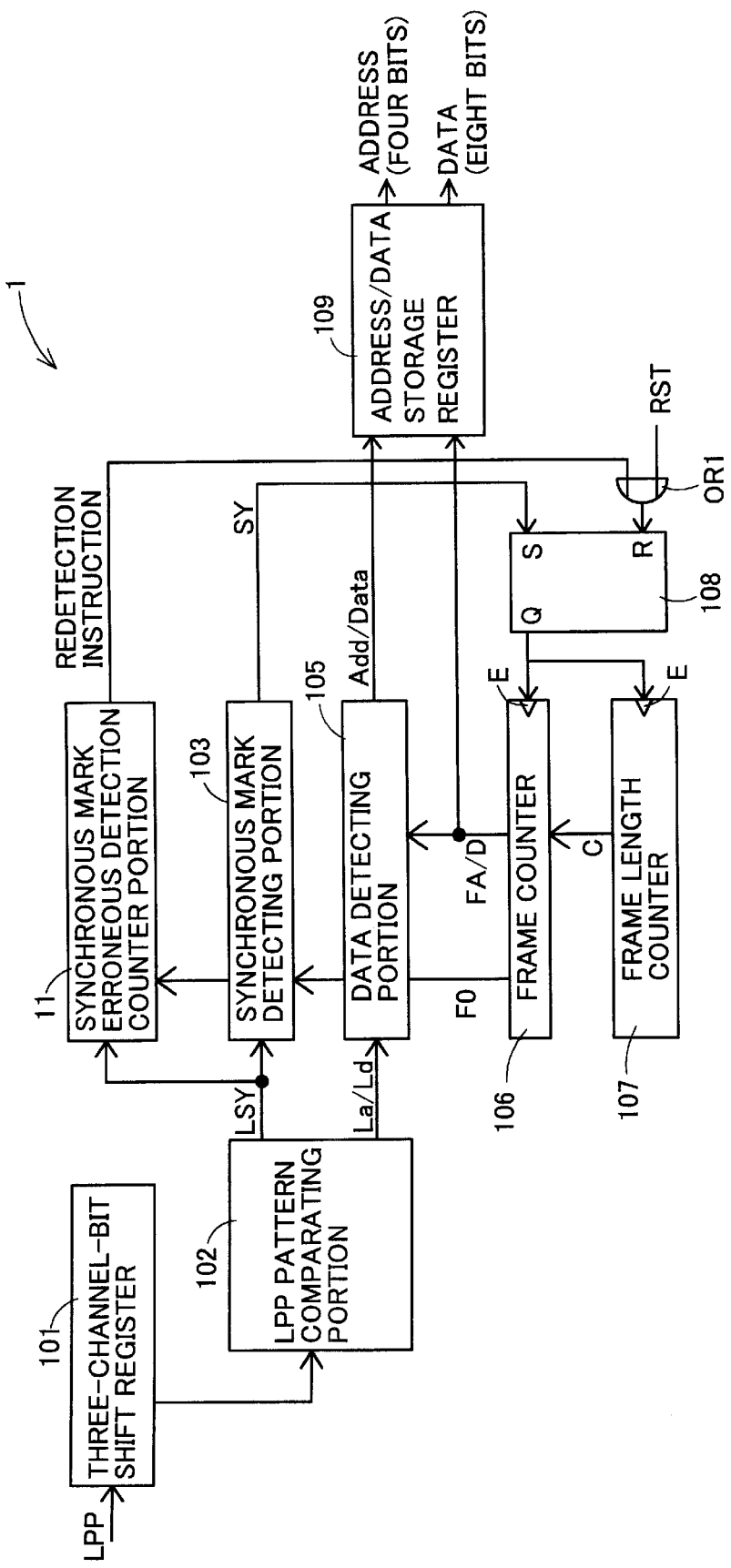
FIG. 1 is a circuit block diagram of an LPP access portion according to a first embodiment of the invention.

Hereinafter, an information access device, an information access method and an information storage medium access system according to first to fifth embodiments of the invention will be described in detail with reference to FIGS. 1 to 14. Note that like components are denoted by like reference symbols or numerals in the drawings showing the first to fifth embodiments as described below and in the drawing showing the related art.

Figure 19:
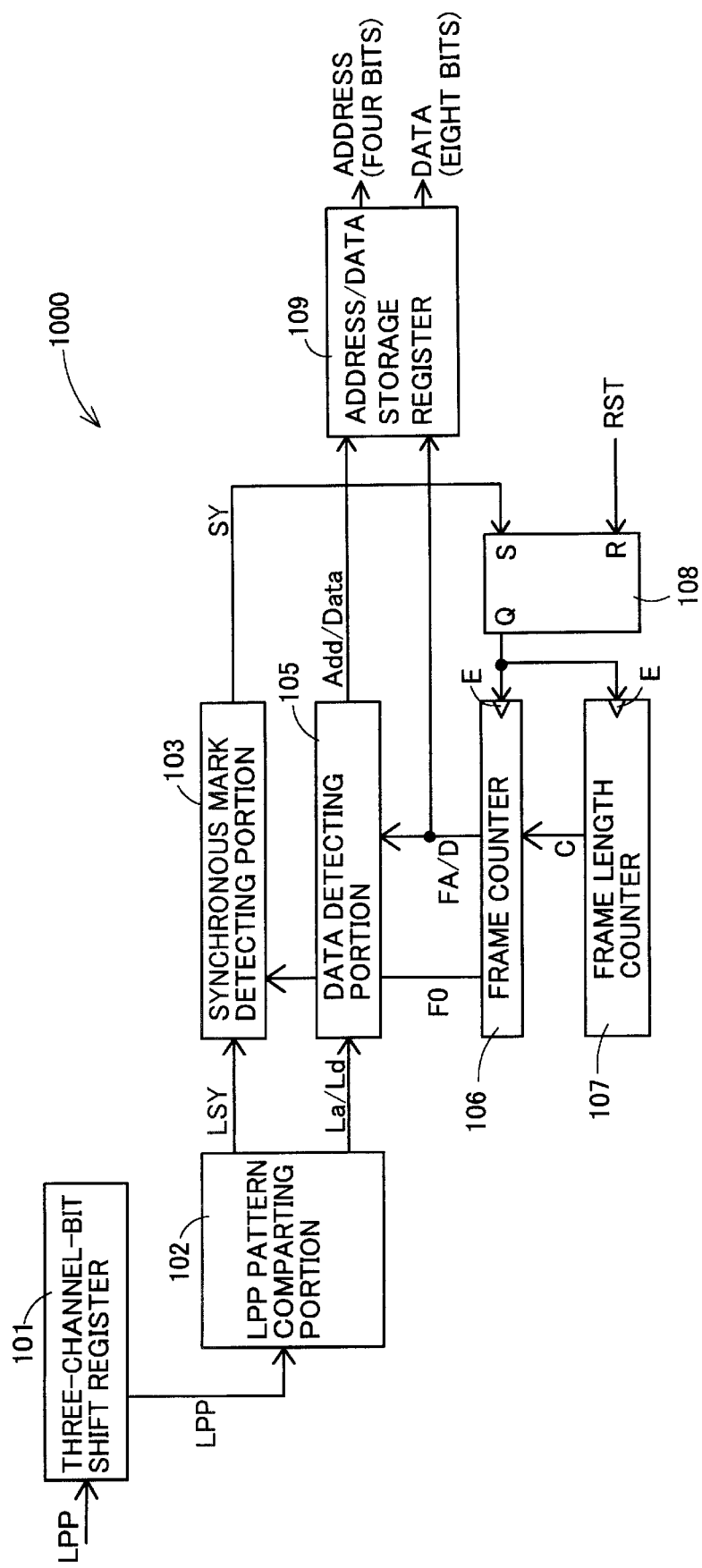
FIG. 19 is a circuit block diagram of an LPP access portion according to the related art.

An LPP access portion 1 of the first embodiment shown in FIG. 1 has a synchronous mark erroneous detection counter portion 11 in addition to the LPP access portion 1000 of the related art shown in FIG. 19. A synchronous mark LSY detected by an LPP pattern comparing portion 102 and an Even/Odd identification signal F0 that is the least significant bit of a frame counter 106 is inputted to a synchronous mark erroneous detection counter portion 11. As an output signal, a redetection instruction signal is outputted as a result of erroneous detection of a synchronous mark. The redetection instruction signal is inputted to a reset input R of an SRFF 108 together with a reset signal RST. Therefore, the redetection instruction signal is ORed with the reset signal RST by an OR gate OR1, and then is inputted to the reset input R of the SRFF 108. The other components are identical in configuration to the LPP access portion 1000 of the related art and thus will not be described herein.

Among operations performed in the LPP access portion 1 of the first embodiment, a series of basic operations including initialization of a frame counter 106 and a frame length counter 107, free-running of the LPP access portion 1 in this state, detection of a synchronous mark by a synchronous mark detecting portion 103, activation of the frame counter 106 and the frame length counter 107, repetition of the counting of 26 data frames constituting one data sector, the outputting of addresses/data Add/Data from a data detecting portion 105 to an address/data storage register 109, an LPP information lock state after assurance of consecutiveness of addresses and detection and correction of data errors, and so on are identical to the operations performed in the LPP access portion 1000 of the related art.

The LPP access portion 1 of the first embodiment has the synchronous mark erroneous detection counter portion 11, which improves the quality of access of LPP information by outputting a redetection instruction signal in response to erroneous detection of a synchronous mark LSY.

Figure 2:
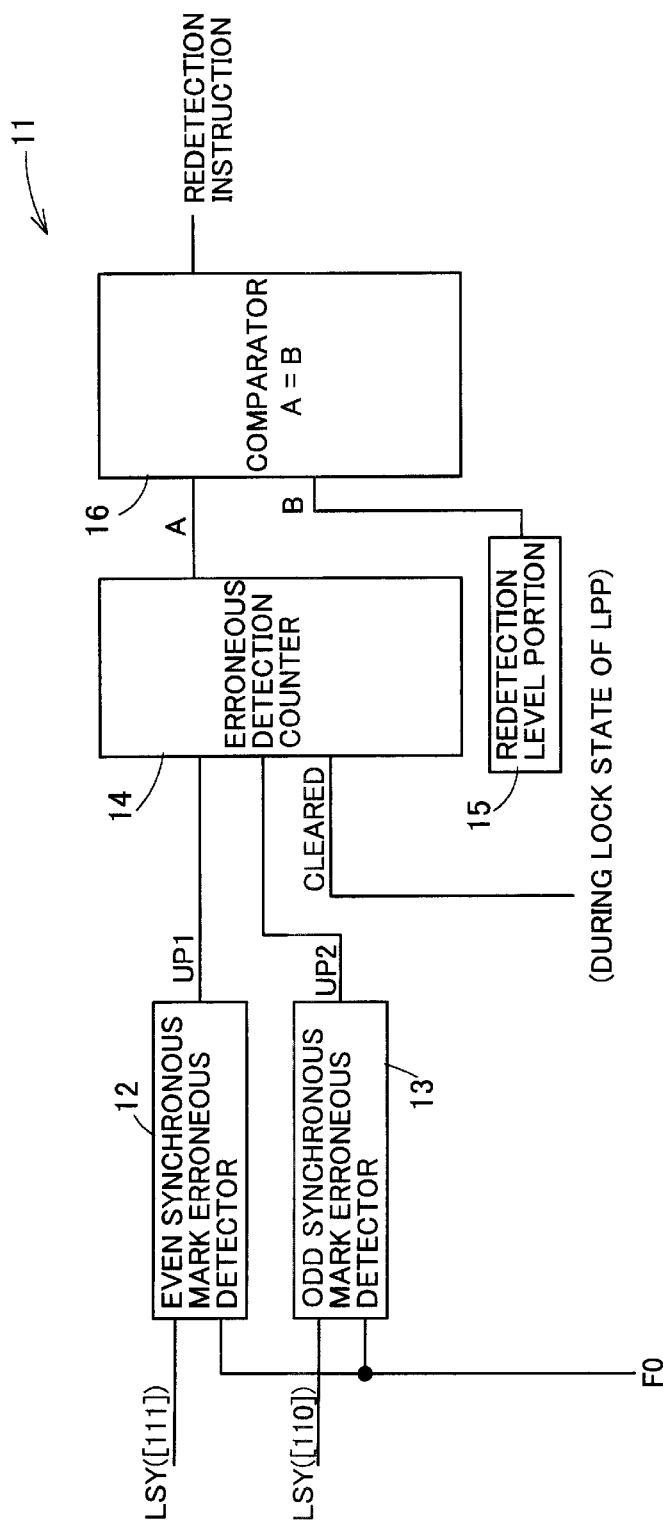
FIG. 2 is a circuit block diagram of a synchronous mark erroneous detection counter portion according to the first embodiment of the invention.

An operation of erroneous detection will be described with reference to the block diagram of the synchronous mark erroneous detection counter portion 11 shown in FIG. 2. The synchronous mark erroneous detection counter portion 11 has an Even synchronous mark erroneous detector 12 that detects a synchronous mark "111" indicating a data frame in an Even region at a data frame position in an Odd region, and an Odd synchronous mark erroneous detector 13 that detects a synchronous mark "110" indicating a data frame in the Odd region at a data frame position in the Even region. An Even/Odd identification signal F0 from the frame counter 106 and a synchronous mark LSY detected by the LPP pattern comparing portion 102 are inputted to the Even synchronous mark erroneous detector 12. Based on the inputting of F0=1 and the synchronous mark LSY="111", the Even synchronous mark erroneous detector 12 outputs a count-up signal UP1. An Even/Odd identification signal F0 from the frame counter 106 and a synchronous mark LSY detected by the LPP pattern comparing portion 102 are inputted to the Odd synchronous mark erroneous detector 13. Based on the inputting of F0=0 and the synchronous mark LSY="110", the Odd synchronous mark erroneous detector 13 outputs a count-up signal UP2.

Both count-up signals UP1, UP2 are inputted to an erroneous detection counter 14. The erroneous detection counter 14 outputs a count signal A indicating the number of outputted count-up signals UP1, UP2. As a clear signal for a count value, a signal indicating transition to a lock state through access of LPP information is inputted.

The count signal A outputted from the erroneous detection counter 14 is inputted to a comparator 16. By comparing the counter signal A with a counter signal B set in a redetection level portion 15, the comparator 16 outputs a redetection instruction signal for redetection of a synchronous mark during LPP access.

The synchronous mark erroneous detection counter portion 11 detects whether or not a synchronous mark LSY that is detected after a data sector cycle subsequent to detection of a synchronous mark LSY by the synchronous mark detecting portion 103 and the start of counting operation of the frame counter 106 and the frame length counter 107, coincides with a count value of the frame counter 106. That is, the synchronous mark erroneous detection counter portion 11 makes use of the fact that if a first synchronous mark LSY is recognized correctly, the Even/Odd identification signal F0 indicated by the frame counter 106 is correct for a synchronous mark LSY of each of the Even/Odd regions after a subsequent cycle.

To be more specific, the Even synchronous mark erroneous detector 12 confirms a synchronous mark LSY inputted from the LPP pattern comparing portion 102 at a timing (F0=1) when an Even/Odd identification signal F0 from the frame counter 106 indicates a data frame position in the Odd region. If the synchronous mark LSY at this moment is detected as the synchronous mark "111" in the Even region, the Even synchronous mark erroneous detector 12 outputs a count-up signal UP1 as erroneous detection of a synchronous mark. Likewise, the Odd synchronous mark erroneous detector 13 confirms a synchronous mark LSY inputted from the LPP pattern comparing portion 102 at a timing (F0=0) when an Even/Odd identification signal F0 from the frame counter 106 indicates a data frame position in the Even region. If the synchronous mark LSY at this moment is detected as the synchronous mark "110" in the Odd region, the Odd synchronous mark erroneous detector 13 outputs a count-up signal UP2 as erroneous detection of a synchronous mark.

Although concrete circuit structures of the Even synchronous mark erroneous detector 12 and the Odd synchronous mark erroneous detector 13 are not shown in the drawings, these detectors can be configured with a simple logic circuit wherein a synchronous mark LSY is captured at F0=1 or 0 and compared with a predetermined synchronous mark pattern "111" or "110" and wherein a signal is outputted in the case of coincidence.

The erroneous detection counter 14 is provided to improve authenticity of erroneous detection from the Even synchronous mark erroneous detector 12 and the Odd synchronous mark erroneous detector 13. In consideration of bit errors or the like of inputted LPP information as well as the fact that predetermined bit errors are detected and corrected, the erroneous detection counter 14 acknowledges authentic deviation in synchronization if erroneous detection has occurred a predetermined number of times. Accordingly, even if erroneous detection has been counted, the contents of the erroneous detection counter 14 are cleared in the case of transition to a lock state through access of LPP information.

An erroneous detection count value A in the erroneous detection counter 14 is subjected to comparison in the comparator 16 at the next stage. If the count value A coincides with an erroneous detection count value B that is set in the redetection level portion 15 and that indicates the necessity to perform an operation of redetection, it is determined that first detection of the synchronous mark LSY was incorrect and that redetection of a synchronous mark LSY for access of LPP information is to be carried out. Then a redetection instruction signal is outputted.

Although the count value B of the redetection level portion 15 may be fixed in advance, it may also be suitably variably set in accordance with bit errors of LPP information in an information storage medium or the functions of detecting and correcting errors and in consideration of other factors.

As described above, on the basis of data frames in which a synchronous mark LSY as a specific control information unit for generating a synchronous timing is stored, the LPP access portion 1 of the first embodiment sets a count value of the frame counter 106, which is an identifier corresponding to each one of the data frames. Thus, if a count value of the frame counter 106 is detected for a synchronous mark LSY as a predetermined control information unit to be stored in a zeroth or first data frame at a predetermined data frame position within a data frame group composed of 26 data frames constituting one data sector ("111" for the zeroth frame and "110" for the first frame), it can be confirmed whether or not the synchronous mark LSY ("111" or "110") has been detected at a proper data frame position.

Further, after generation of a synchronized timing by the synchronous mark LSY, a synchronous mark LSY detected in a subsequent data sector cycle is used as a predetermined control information unit. Therefore, with a data sector cycle defined as one cycle, it can be confirmed as to each cycle whether or not the synchronous marks LSY "111" and "110" are detected in the zeroth and first frames respectively.

Further, the number of times of erroneous detection can be counted. By merely changing a predetermined count value for triggering an operation of redetection, the timing for the operation of redetecting a synchronous mark LSY can be changed.

When access LPP information as a control information string by detecting a data bit signal La/Ld and a synchronous mark LSY as control information units that are stored in unit storage regions, i.e. a pair of Even/Odd regions including an Odd region as spare data frames, even if a access operation is erroneously performed with a synchronous timing associated with erroneous detection of the synchronous mark LSY being deviant from a data frame in which the synchronous mark LSY and the data bit signal La/Ld are stored, a deviation in frame management is detected quickly and reliably and an operation of redetecting a synchronous mark LSY is performed. This makes it possible to reproduce LPP information accurately. Thus, recuperation from the deviation in frame management is accelerated and a considerable contribution to enhancement of TAT in access of LPP information is made.

Figure 3:
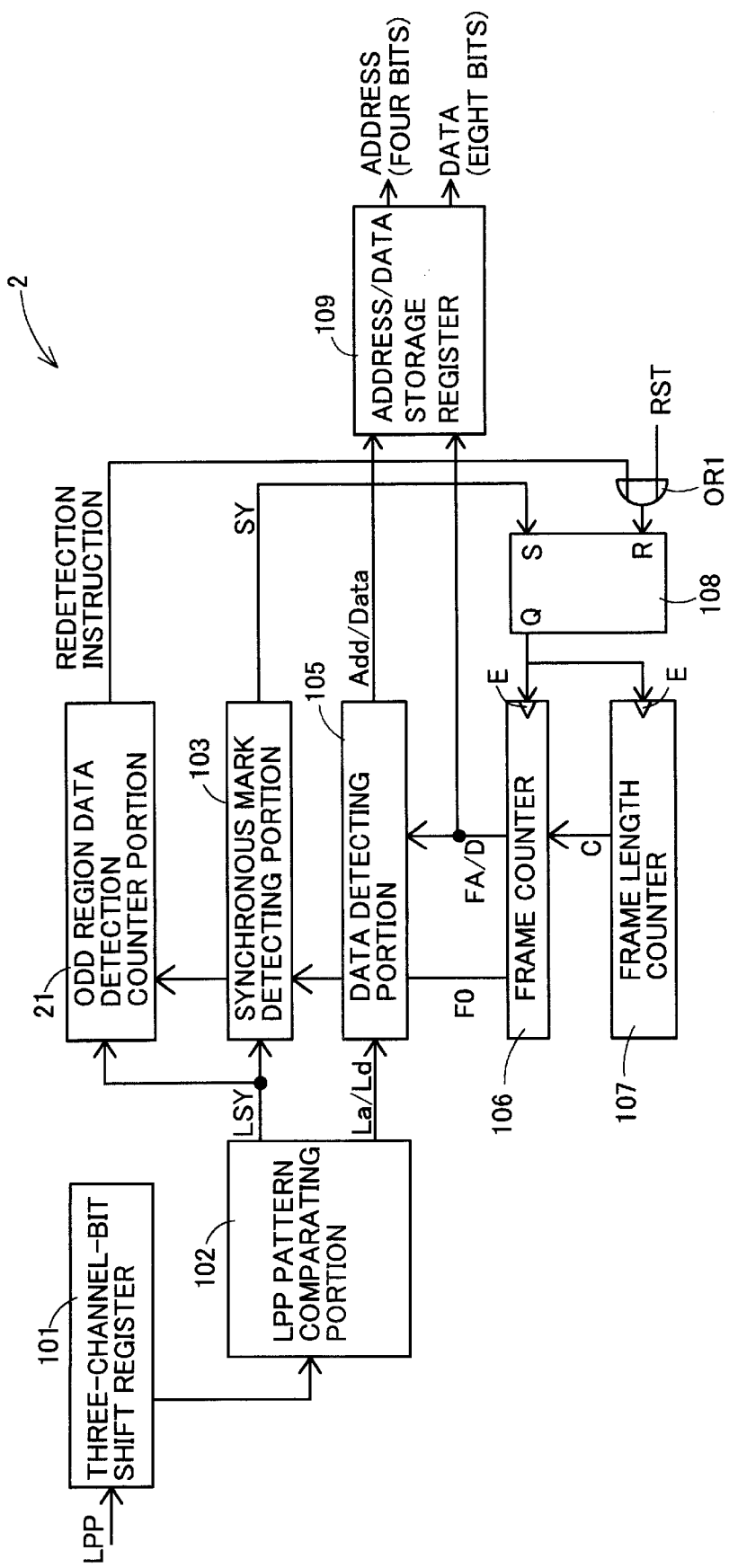
FIG. 3 is a circuit block diagram of an LPP access portion according to a second embodiment of the invention.

An LPP access portion 2 of the second embodiment shown in FIG. 3 has an Odd region data detection counter portion 21 in addition to the LPP access portion 1000 of the related art shown in FIG. 19. A data bit signal La/Ld detected by the LPP pattern comparing portion 102 and an Even/Odd identification signal F0 that is the least significant bit of the frame counter 106 are inputted to the Odd region data detection counter portion 21. As an output signal, a redetection instruction signal is outputted as a result of detection of the data bit signal La/Ld from a count value of the frame counter 106 indicating a data frame position in the Odd region. The redetection instruction signal is inputted to the reset input R of the SRFF 108 together with a reset signal RST. Therefore, the redetection instruction signal is ORed with the reset signal RST by the OR gate OR1, and then is inputted to the reset input R of the SRFF 108. The other components are identical in configuration to the LPP access portion 1000 of the related art and thus will not be described herein.

A series of basic operations that are performed in the LPP access portion 1 of the first embodiment and that are identical to those performed in the LPP access portion 1000 of the related art are also performed in the LPP access portion 2 of the second embodiment.

The LPP access portion 2 of the second embodiment has the Odd region data detection counter portion 21, which improves the quality of access of LPP information by outputting a redetection instruction signal for a case where data bit signals La/Ld arranged basically in data frames of an Even region are detected with a certain frequency as count values of the frame counter 106 corresponding to a data frame position in an Odd region.

Figure 4:
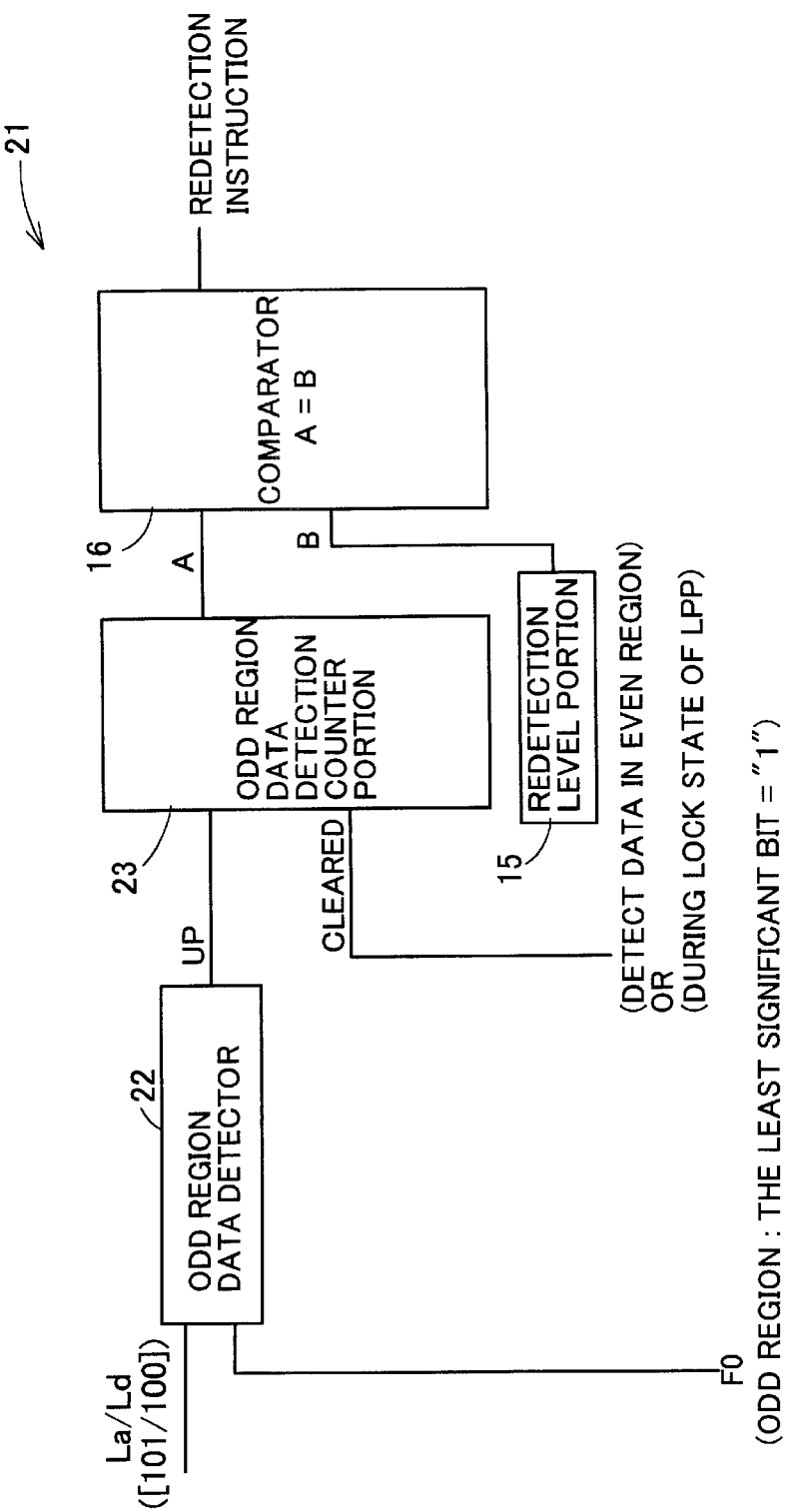
FIG. 4 is a circuit block diagram of a synchronous mark erroneous detection counter portion according to the second embodiment of the invention.

An operation of erroneous detection will be described with reference to the block diagram of the Odd region data detection counter portion 21 shown in FIG. 4. The Odd region data detection counter portion 21 has an Odd region data detector 22 and an Odd region data detection counter 23 instead of the Even synchronous mark erroneous detector 12, the Odd synchronous mark erroneous detector 13 and the erroneous detection counter 14 of the synchronous mark erroneous detection counter portion 11 of the first embodiment. An Even/Odd identification signal F0 from the frame counter 106 and a data bit signal La/Ld detected by the LPP pattern comparing portion 102 are inputted to the Odd region data detector 22. Based on the inputting of F0=1 and the data bit signal La/Ld, the Odd region data detector 22 outputs a count-up signal UP. Note that the data bit signal La/Ld assumes "100" for a data bit "0" and "101" for a data bit "1".

The count-up signal UP is inputted to the Odd region data detection counter 23. The Odd region data detection counter 23 outputs a count signal A indicating the number of outputted count-up signals UP. As a clear signal for a count value, a signal indicating detection of a data bit signal La/Ld at a data frame position in the Even region or transition to a lock state through access of LPP information is inputted.

Because the redetection level portion 15 and the comparator 16 are identical in configuration to the synchronous mark erroneous detection counter portion 11 of the first embodiment, description thereof will be omitted.

If a synchronous mark LSY has been detected by the synchronous mark detecting portion 103 and counting operations of the frame counter 106 and the frame length counter 107 have been started, the Odd region data detection counter portion 21 determines where in the count value of the frame counter 106 the data bit signal La/Ld is detected. That is, the Odd region data detection counter portion 21 makes use of the fact that if a synchronous mark LSY is recognized correctly, the data bit signal La/Ld is basically to be arranged in a data frame in the Even region.

To be more specific, the Odd region data detector 22 outputs a count-up signal UP if a data bit signal La/Ld is detected at a timing (F0=1) when an Even/Odd identification signal F0 indicates a data frame position in the Odd region.

Although a concrete circuit structure of the Odd region data detector 22 is not shown in the drawings, the detector 22 can be configured with a simple logic circuit wherein a data bit signal La/Ld is captured at F0=1 and compared with a predetermined data bit pattern "100" (in the case of a data bit "0") or "101" (in the case of a data bit "1") and wherein a signal is outputted in the case of coincidence.

The Odd region data detection counter portion 23 is provided to improve authenticity of erroneous detection from the Odd region data detector 22. In consideration of bit errors or the like of inputted LPP information as well as the fact that predetermined bit errors are detected and corrected, the Odd region data detection counter portion 23 acknowledges authentic deviation in synchronization if detection by the Odd region data detector 22 is made a predetermined number of times. Accordingly, even if counting has been carried out in the Odd region data detection counter portion 23, the contents of the Odd region data detection counter portion 23 are cleared in the case of detection of a data bit signal La/Ld at a data frame position in the Even region or in the case of transition to a lock state through access of LPP information.

As described above, on the basis of a data frame in which a synchronous mark LSY as a specific control information unit for generating a synchronized timing is stored, the LPP access portion 2 of the second embodiment sets a count value of the frame counter 106 as a corresponding identifier for each of the data frames. Therefore, if a count value is detected for a data bit signal La/Ld as a predetermined control information unit stored in principle in the Even region that is a predetermined data frame position within a data frame group constituting one data sector, it can be confirmed whether or not the data bit signal La/Ld has been detected in the Even region.

Further, since a predetermined control information unit is defined in the case where a data bit signal La/Ld is stored in the Even region that is a usual storage position, a deviation in frame management associated with erroneous detection of a synchronous mark LSY can be confirmed by checking whether the data bit signal La/Ld is detected as count values corresponding to a data frame in the Even region or as count values corresponding to a data frame in the Odd region that is a spare region.

That is, if the data bit signal La/Ld, which is to be detected in principle as a count value corresponding to a data frame in the Even region, is detected with a certain frequency or more as a count value corresponding to a data frame in the Odd region, a deviation in frame management can be confirmed.

The frequency in this instance can be confirmed by counting the number of times of detection. By merely changing a predetermined count value for triggering an operation of redetection, the timing for the operation of redetecting a synchronous mark LSY can be changed.

When access LPP information by detecting a data bit signal La/Ld stored in a unit storage region, i.e. a pair of Even/Odd regions including an Odd region, even if a access operation is erroneously performed with a synchronized timing associated with erroneous detection of the synchronous mark LSY being deviant from a data frame in which the data bit signal La/Ld is stored, a deviation in frame management is detected quickly and reliably and an operation of redetecting a synchronous mark LSY is performed. This makes it possible to reproduce LPP information accurately. Thus, recuperation from the deviation in frame management is accelerated and a considerable contribution to enhancement of TAT in access of LPP information is made.

Figure 5:
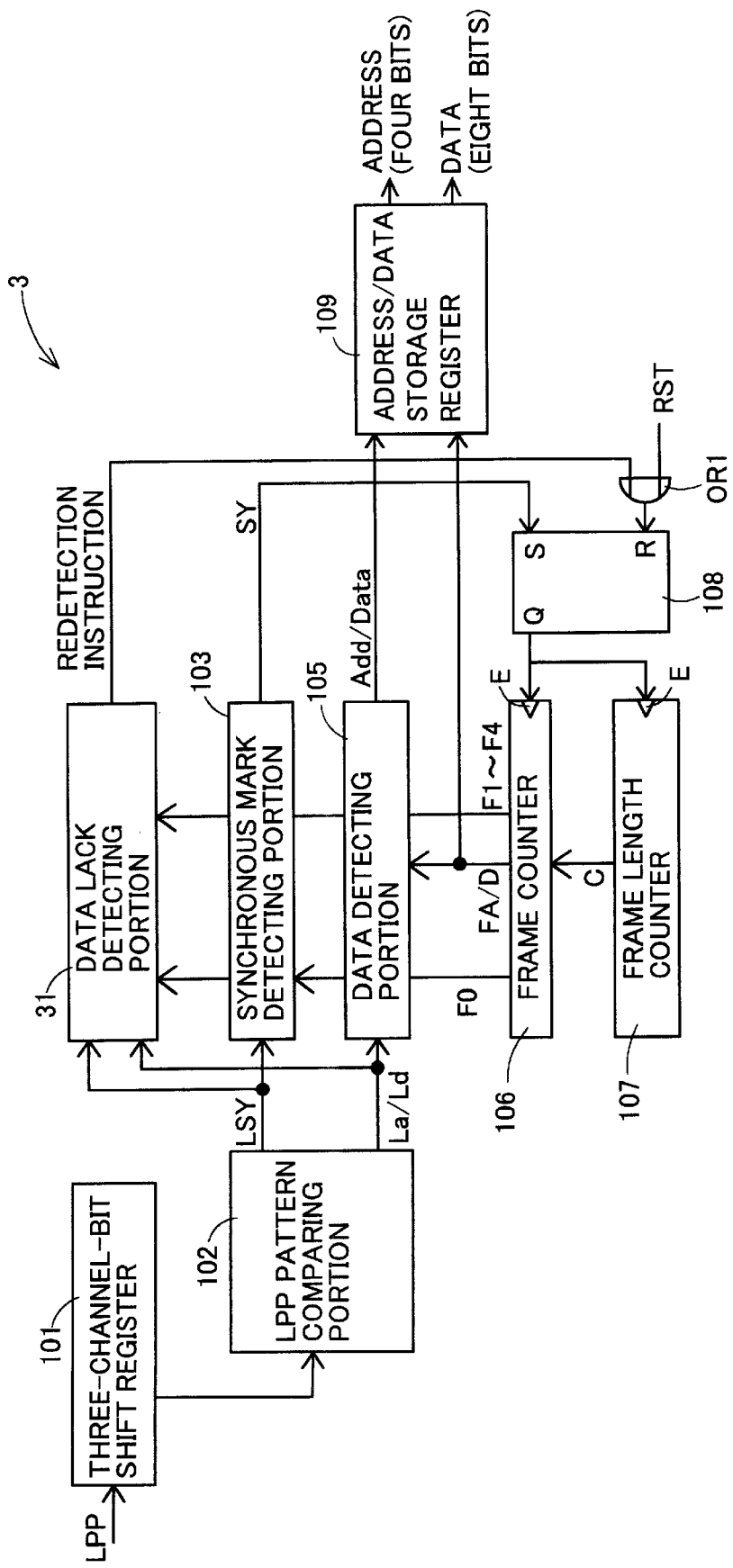
FIG. 5 is a circuit block diagram of an LPP access portion according to a third embodiment of the invention.

An LPP access portion 3 of the third embodiment shown in FIG. 5 has a data lack detecting portion 31 in addition to the LPP access portion 1000 of the related art shown in FIG. 19. A synchronous mark LSY and a data bit signal La/Ld detected by the LPP pattern comparing portion 102, an Even/Odd identification signal F0 that is the least significant bit of the frame counter 106, and Even/Odd identification signals F1 to F4 that are the first to fourth bits of the frame counter 106 are inputted to the data lack detecting portion 31. As an output signal, a redetection instruction signal is outputted as a result of detection of lack of data. The redetection instruction signal is inputted to the reset input R of the SRFF 108 together with a reset signal RST via the OR gate OR1. The other components are identical in configuration to the LPP access portion 1000 of the related art and thus will not be described herein.

A series of basic operations that are performed in the LPP access portion 1 of the first embodiment and that are identical to those performed in the LPP access portion 1000 of the related art are also performed in the LPP access portion 3 of the third embodiment.

The LPP access portion 3 of the third embodiment has the data lack detecting portion 31, which improves the quality of access of LPP information by outputting a redetection instruction signal if it is determined that lack of data has occurred with a synchronous mark LSY or a data bit signal La/Ld failing to be detected at a data frame position as a storage position.

Figure 6:
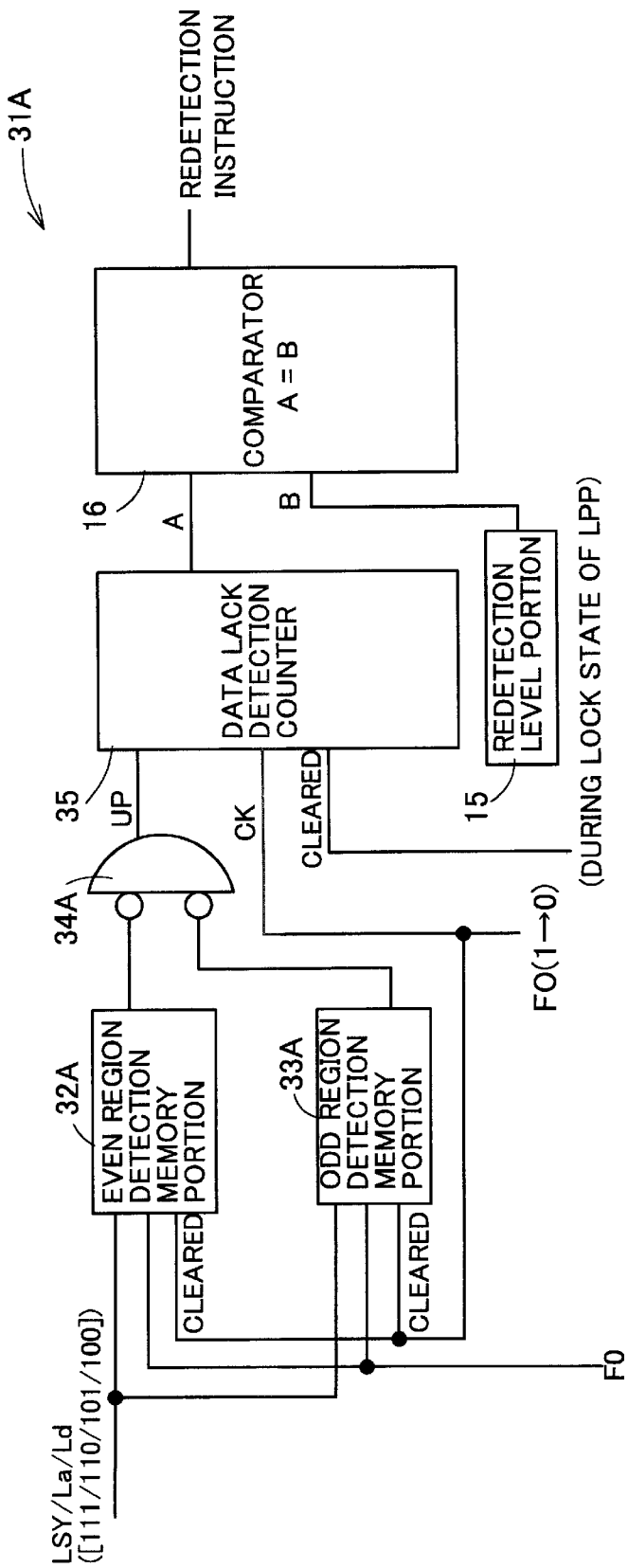
FIG. 6 is a circuit block diagram of a data lack detecting portion according to a first concrete example of the third embodiment of the invention.

A data lack detecting portion 31A according to a first concrete example shown in FIG. 6 has an Even region detection memory portion 32A that detects a synchronous mark LSY ("111", "110") or a data bit signal La/Ld ("100" for a data bit "0" and "101" for a data bit "1") by an Even/Odd identification signal F0 (F0=0) indicating a data frame position in the Even region, and an Odd region detection memory portion 33A that detects a synchronous mark LSY ("111", "110") or a data bit signal La/Ld ("100", "101") by an Even/Odd identification signal F0 (F0=1) indicating a data frame position in the Odd region. If neither the synchronous mark LSY ("111", "110") nor the data bit signal La/Ld ("100", "101") is detected from the Even region detection memory portion 32A at the timing of F0=0 and if neither the synchronous mark LSY ("111", "110") nor the data bit signal La/Ld ("100", "101") is detected from the Odd region detection memory portion 33A at the timing of F0=1, a count-up signal UP is outputted via a logic gate 34A.

The count-up signal UP is inputted to a data lack detection counter 35. The data lack detection counter 35 uses, as a clock signal CK, a timing for termination of a pair of data frames in the Even/Odd regions in which one LPP information unit is stored, i.e. a timing for transition of the Even/Odd identification signal F0 from 1 to 0, counts the number of outputted count-up signals UP, and outputs the result as a count signal A. As a clear signal of the count value, a signal indicating transition to a lock state through access of LPP information is inputted.

The data lack detecting portion 31A determines whether or not a synchronous mark LSY ("111", "110") or a data bit signal La/Ld ("100", "101") is detected in a pair of data frames in the Even/Odd regions after detection of a synchronous mark LSY by the synchronous mark detecting portion 103 and the start of counting operations of the frame counter 106 and the frame length counter 107. That is, the data lack detecting portion 31A makes use of the fact that a data bit signal La/Ld or the like is recognized in a certain one of data frames in the Even/Odd regions among the respective pairs of data frames if synchronization is attained properly.

Although concrete circuit structures of the Even region detection memory portion 32A and the Odd region detection memory portion 33A are not shown in the drawings, they can be configured with a simple logic circuit wherein it is detected and memorized whether or not a synchronous mark LSY ("111", "110") and a data bit signal La/Ld ("100", "101") are detected at a timing of F0=0 or 1 and wherein a signal is then outputted.

The data lack detection counter 35 is provided to improve authenticity of detection from the Even region detection memory portion 32A and the Odd region detection memory portion 33A. In consideration of bit errors or the like of inputted LPP information as well as the fact that predetermined bit errors are detected and corrected, the data lack detection counter 35 acknowledges authentic deviation in synchronization if no data bit signal La/Ld or the like is detected in a predetermined number of pairs of data frames. Accordingly, even if counting has been carried out erroneously, the contents of the data lack detection counter 35 are cleared in the case of transition to a lock state through access of LPP information.

Figure 7:
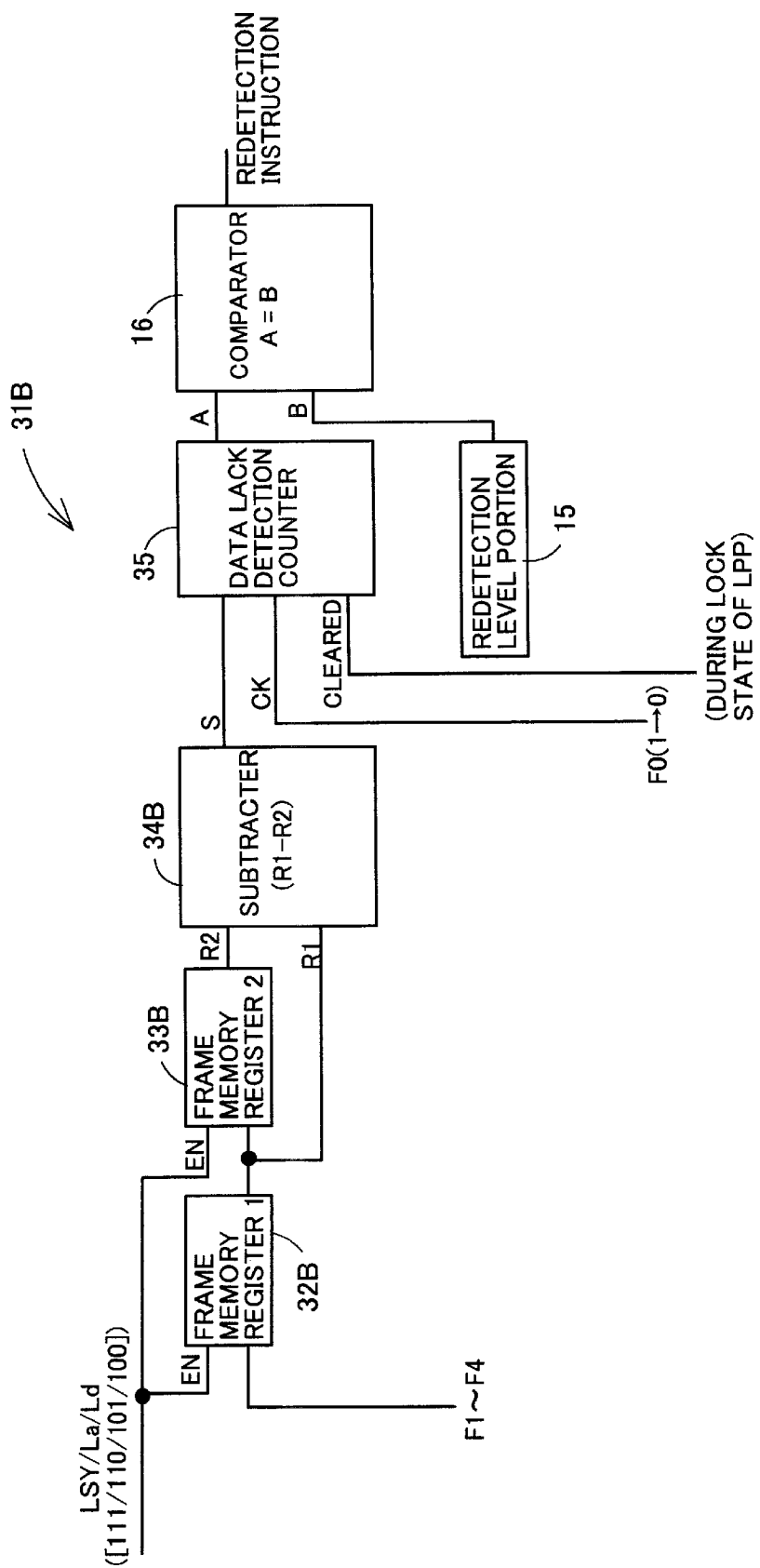
FIG. 7 is a circuit block diagram of a data lack detecting portion according to a second concrete example of the third embodiment of the invention.

A data lack detecting portion 31B according to a second concrete example shown in FIG. 7 has a frame memory register 1 (32B) to which four low order bits F1 to F4 except the least significant bit F0 of the frame counter 106 are inputted, and a frame memory register 2 (33B) to which the contents of the frame memory register 1 (32B) are inputted. A synchronous mark LSY ("111", "110") or a data bit signal La/Ld ("100", "101") is connected with enable terminals EN of the frame memory register 1 (32B) and the frame memory register 2 (33B). An output signal R1 of the frame memory register 1 (32B) and an output signal R2 of the frame memory register 2 (33B) are inputted to a subtracter 34B. A calculation result is outputted from the subtracter 34B and inputted to the data lack detection counter 35. The data lack detection counter 35 is identical in configuration to that of the first concrete example and thus will not be described below.

The data lack detecting portion 31B determines whether or not a synchronous mark LSY ("111", "110") or a data bit signal La/Ld ("100", "101") is detected in a pair of data frames in the Even/Odd regions after detection of a synchronous mark LSY by the synchronous mark detecting portion 103 and the start of counting operations of the frame counter 106 and the frame length counter 107. That is, the data lack detecting portion 31B makes use of the fact that a data bit signal La/Ld or the like is recognized in a certain one of data frames in the Even/Odd regions among the respective pairs of data frames if synchronization is attained properly.

If a first data signal La/Ld or the like, i.e. one of two adjacent data bit signals La/Ld or the like is inputted, the enable terminals EN of the frame memory register 1 (32B) and the frame memory register 2 (33B) are activated. Then, both the frame memory register 1 (32B) and the frame memory register 2 (33B) set data in the registers. Namely, count values of the four low order bits F1 to F4 of the frame counter 106 are set in the frame memory register 1 (32B), whereas a register value of the frame memory register 1 (32B) is set in the frame memory register 2 (33B). Because the contents of the register of the frame memory register 1 (32B) have been initialized when starting operation, the contents set in the frame memory register 2 (33B) are also maintained in an initialized state. Furthermore, if a second data bit signal La/Ld or the like is inputted, the contents of the register of the frame memory register 1 (32B) are transferred to the frame memory register 2 (33B), and the count values F1 to F4 that have been counted up are set in the register of the frame memory register 1 (32B). Thus, a count value R2 of the frame counter 106 at the time when the first value of adjacent data bit signals La/Ld or the like is inputted is set in the register of the frame memory register 2 (33B), whereas a count value R1 of the frame counter 106 at the time when the second data bit signal La/Ld is inputted is set in the register of the frame memory register 1 (32B).

If the count values R1, R2 corresponding to the adjacent data bit signals La/Ld or the like are subjected to subtraction (R1−R2) by the subtracter 34B, a distance between data frames in which the adjacent data bit signals La/Ld or the like are stored is calculated. It is because one unit of data bit signal La/Ld or the like is stored with two data frames in the Even/Odd regions defined as a pair that the least significant bit F0 of the frame counter 106 is excluded from the subtraction processing. Mathematically this corresponds to division of a count value of the frame counter 106 by two. This means calculation of a difference in bit position between adjacently detected data bit signals La/Ld or the like in 13-bit LPP information constituting one data sector.

If this difference in bit position is two or more (it is −11 or less if the thirteenth bit is at the first bit position of the adjacent data bit signals La/Ld or the like), one or more count values corresponding to storage regions of one or more data bit signals La/Ld or the like exist between the adjacent data bit signals La/Ld or the like. There is no data bit signal La/Ld or the like therebetween, and a state of lack of data is detected.

Figure 8:
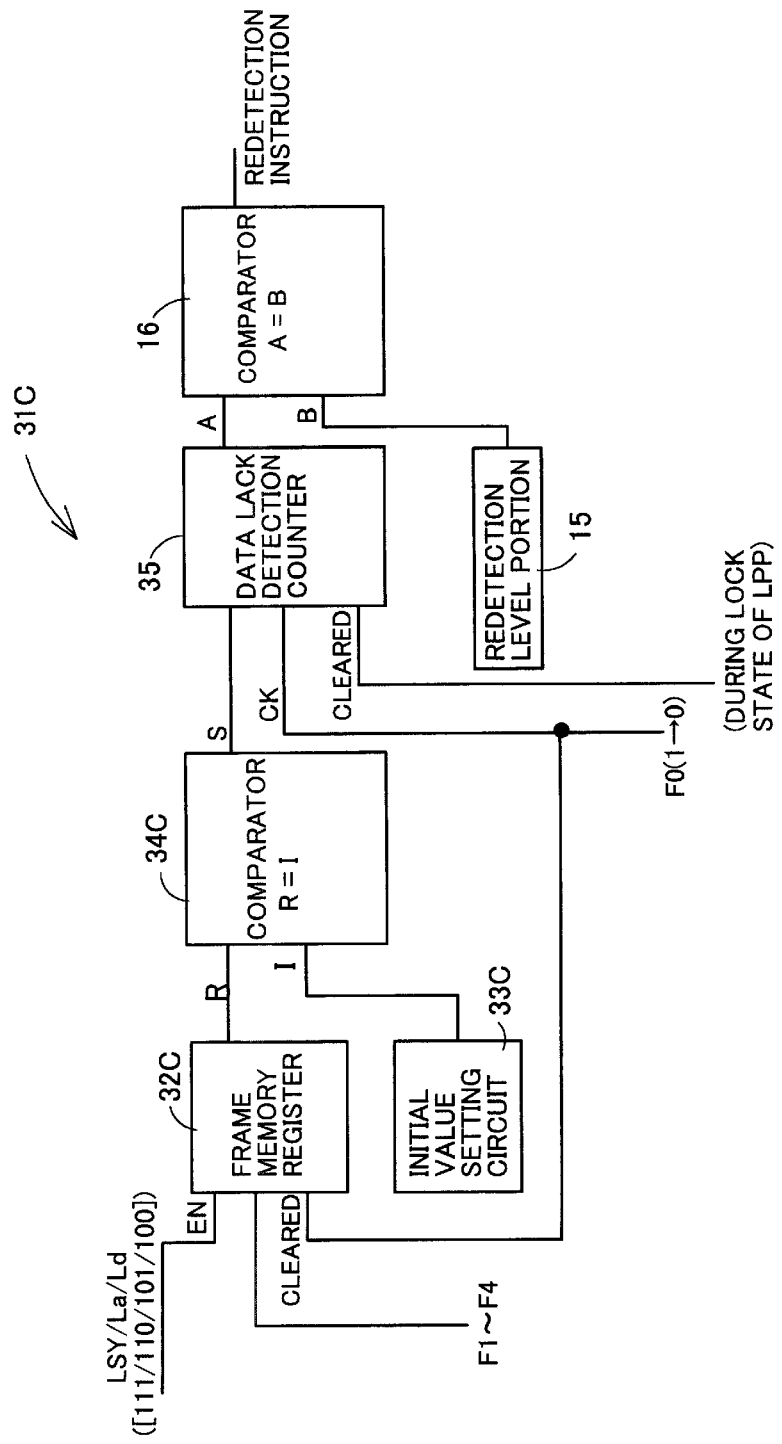
FIG. 8 is a circuit block diagram of a data lack detecting portion according to a third concrete example of the third embodiment of the invention.

A data lack detecting portion 31C according to a third concrete example shown in FIG. 8 has a frame memory register 32C to which four low order bits F1 to F4 except the least significant bit F0 of the frame counter 106 are inputted, and an initial value setting circuit 33C for setting an initial value for the frame memory register 32C. A synchronous mark LSY ("111", "110") or a data bit signal La/Ld ("100", "101") is connected with an enable terminal EN of the frame memory register 32C. Further, a signal that is generated at a timing when the least significant bit F0 of the frame counter 106 makes a transition from 1 to 0 is inputted as a clear signal. An output signal R of the frame memory register 32C and an output signal I of the initial value setting circuit 33C are inputted to a comparator 34C. A calculation result S is outputted from the comparator 34C and inputted to the data lack detection counter 35. The data lack detection counter 35 is identical in configuration to those of the first and second concrete examples and thus will not be described below.

The data lack detecting portion 31C determines whether or not a synchronous mark LSY ("111", "110") or a data bit signal La/Ld ("100", "101") is detected in a pair of data frames in the Even/Odd regions after detection of a synchronous mark LSY by the synchronous mark detecting portion 103 and the start of counting operations of the frame counter 106 and the frame length counter 107. That is, the data lack detecting portion 31C makes use of the fact that a data bit signal La/Ld or the like is recognized in a certain one of data frames in the Even/Odd regions among the respective pairs of data frames if synchronization is attained properly.

If a data bit signal La/Ld or the like is inputted, the enable terminal EN of the frame memory register 32c is activated and sets data in the register. That is, four low order bits F1 to F4 of the frame counter 106 are set as a count value R. The frame memory register 32C is reset at a timing for termination of a pair of data frames in the Even/Odd regions in which one LPP information unit such as a data bit signal La/Ld or the like is stored, i.e. at a timing for transition of the Even/Odd identification signal F0 from 1 to 0. Thus, if no data bit signal La/Ld or the like is inputted in the meantime, the register value R of the frame memory register 32C is maintained at an initial value.

If the count value R is compared with an initial value I from the initial value setting circuit 33C by the comparator 34C, it can be confirmed whether or not one LPP information unit such as a data bit signal La/Ld or the like is stored in a pair of data frames in the Even/Odd regions. It is because one unit of data bit signal La/Ld or the like is stored with two data frames in the Even/Odd regions defined as a pair that the least significant bit F0 is excluded from a signal inputted to the frame memory register 32c. Mathematically this corresponds to division of a count value of the frame counter 106 by two. That is, it is confirmed in the comparator 34C whether or not there is a data bit signal La/Ld or the like in a pair of data frames in the Even/Odd regions.

If the count value R and the initial value I coincide with each other as a result of this comparison, the comparator 34C outputs an output signal S. It is indicated at this moment that no data bit signal La/Ld or the like is detected by a count value corresponding to both the data frames in the Even/Odd regions constituting one unit storage region. Lack of data is detected in a pair of data frames as one unit storage region, and it is determined that there is a deviation in synchronization.

As described above, the LPP access portion 3 of the third embodiment has a synchronous mark and a data bit signal La/Ld as a control information unit stored in the unit storage region that defines two data frames in the Even/Odd regions as a unit. Therefore, if a relation between the data bit signal La/Ld or the like and the unit storage region is confirmed by a count value of the frame counter 106 that is an identifier corresponding to the detected data bit signal La/Ld or the like, a deviation in frame management can be confirmed.

To be more specific, if the existence of a unit storage region in which no data bit signal La/Ld or the like is detected is confirmed, a deviation in frame management can be confirmed.

That is, since a control information unit such as a data bit signal La/Ld or the like is stored in one unit storage region, a deviation in frame management can be confirmed if the existence of a unit storage region in which no data bit signal La/Ld or the like is detected is confirmed by a count value of the frame counter 106 corresponding to the detected data bit signal La/Ld or the like. Alternatively, a deviation in frame management can be confirmed if the existence of a unit storage region in which no data bit signal La/Ld or the like is detected is confirmed among detected data bit signals La/Ld or the like.

Further, the frequency in this instance can be confirmed by counting the number of times of detection. By merely changing a predetermined count value for triggering an operation of redetection, the timing for the operation of redetecting a synchronous mark LSY can be changed.

Because this confirmation can be carried out through detection between adjacent data bit signals La/Ld or the like, it is possible to quickly and reliably confirm a deviation in frame management and accurately reproduce LPP information as a control information string. Thus, recuperation from the deviation in frame management is accelerated and a considerable contribution to enhancement of TAT in access of LPP information is made.

Figure 9:
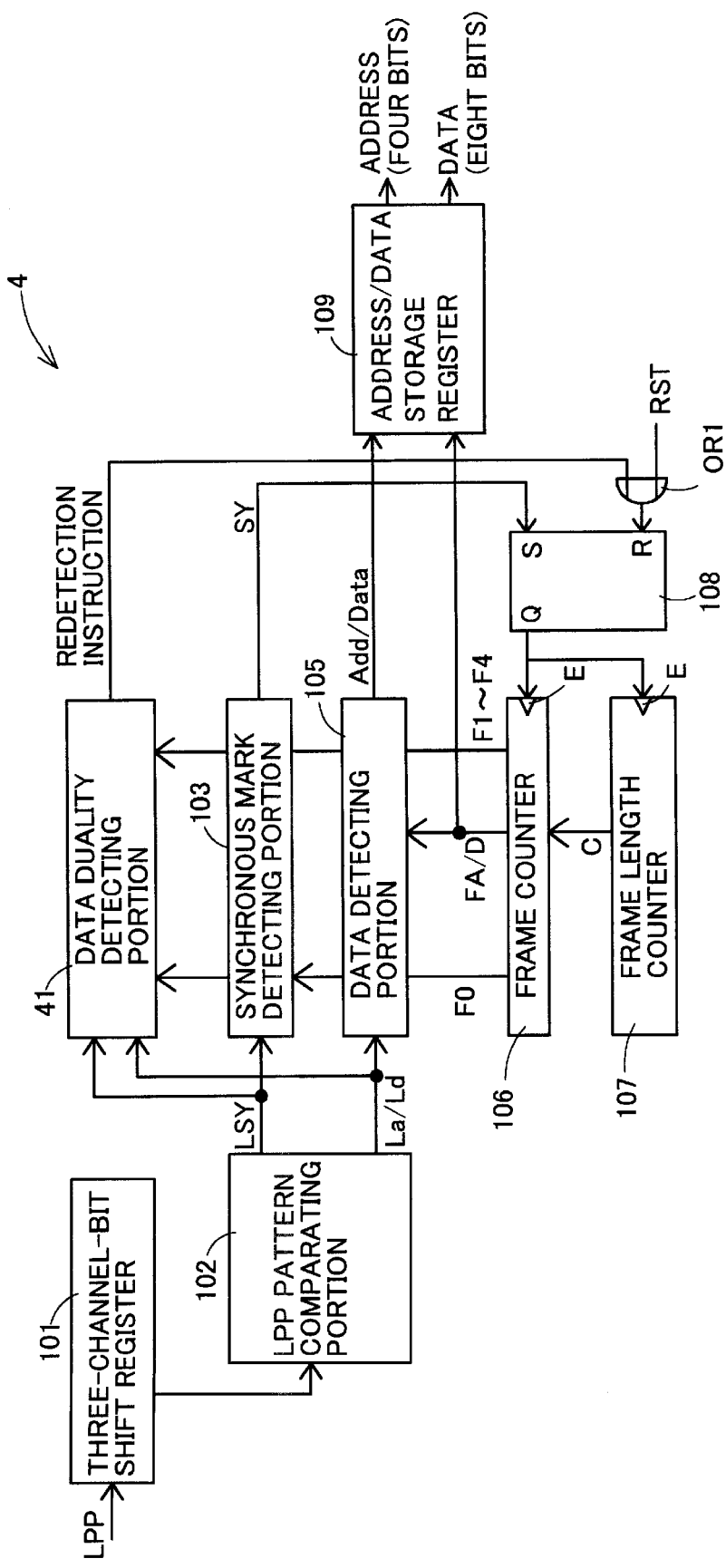
FIG. 9 is a circuit block diagram of an LPP access portion according to a fourth embodiment of the invention.

An LPP access portion 4 of the fourth embodiment shown in FIG. 9 has a data duality detecting portion 41 in addition to the LPP access portion 1000 of the related art shown in FIG. 19. A synchronous mark LSY and a data bit signal La/Ld detected by the LPP pattern comparing portion 102, an Even/Odd identification signal F0 that is the least significant bit of the frame counter 106, and Even/Odd identification signals F1 to F4 that are the first to fourth bits of the frame counter 106 are inputted to the data duality detecting portion 41. As an output signal, a redetection instruction signal is outputted as a result of detection of duality of data. The redetection instruction signal is inputted to the reset input R of the SRFF 108 together with a reset signal RST via the OR gate OR1. The other components are identical in configuration to the LPP access portion 1000 of the related art and thus will not be described herein.

A series of basic operations that are performed in the LPP access portion 1 of the first embodiment and that are identical to those performed in the LPP access portion 1000 of the related art are also performed in the LPP access portion 4 of the fourth embodiment.

The LPP access portion 4 of the fourth embodiment has a data duality detecting portion 41, which improves the quality of access of LPP information by outputting a redetection instruction signal if it is determined that duality of data has occurred with a synchronous mark LSY or a data bit signal La/Ld being detected in each of a pair of data frames in Even/Odd regions constituting a unit storage region in which one LPP information unit is stored.

Figure 10:
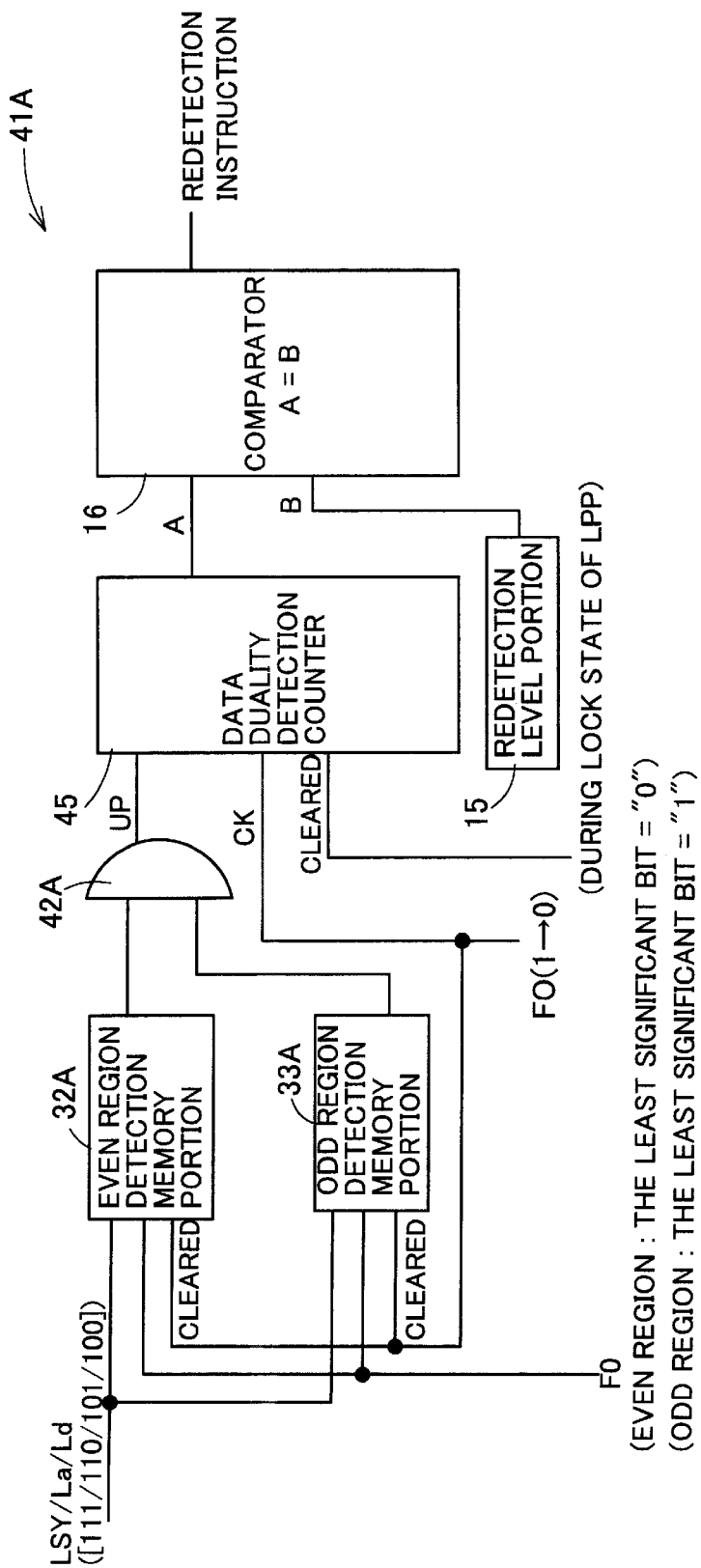
FIG. 10 is a circuit block diagram of a data duality detecting portion according to a first concrete example of the fourth embodiment of the invention.

A data duality detecting portion 41A according to a first concrete example of the fourth embodiment shown in FIG. 10 has the Even region detection memory portion 32A and the Odd region detection memory portion 33A as employed in the first concrete example of the third embodiment. If a synchronous mark LSY ("111", "110") or a data bit signal La/Ld ("100", "101") is detected from the Even region detection memory portion 32A at a timing of F0=0 and if a synchronous mark LSY ("111", "110") or a data bit signal La/Ld ("100", "101") is detected from the Odd region detection memory portion 33A at a timing of F0=1, a count-up signal UP is outputted via a logic gate 42A.

The count-up signal UP is inputted to a data duality detection counter 45. The data duality detection counter 45 uses, as a clock signal CK, a timing for termination of a pair of data frames in the Even/Odd regions constituting a unit storage region, i.e. a timing for transition of the Even/Odd identification signal F0 from 1 to 0, counts the number of outputted count-up signals UP, and outputs the result as a count signal A. As a clear signal of the count value, a signal indicating transition to a lock state through access of LPP information is inputted.

The data duality detecting portion 41A determines whether or not a synchronous mark LSY ("111", "110") or a data bit signal La/Ld ("100", "101") is correctly detected in a pair of data frames in the Even/Odd regions after detection of a synchronous mark LSY by the synchronous mark detecting portion 103 and the start of counting operations of the frame counter 106 and the frame length counter 107. That is, the data duality detecting portion 41A makes use of the fact that a data bit signal La/Ld or the like is recognized in a certain one of data frames in the Even/Odd regions among the respective pairs of data frames if synchronization is attained properly.

The data duality detection counter 45 is provided to improve authenticity of detection from the Even region detection memory portion 32A and the Odd region detection memory portion 33A. In consideration of bit errors or the like of inputted LPP information as well as the fact that predetermined bit errors are detected and corrected, the data duality detection counter 45 acknowledges authentic deviation in synchronization if no data bit signal La/Ld is detected in a predetermined number of pairs of data frames. Accordingly, even if counting has been carried out erroneously, the contents of the data duality detection counter 45 are cleared in the case of transition to a lock state through access of LPP information.

Figure 11:
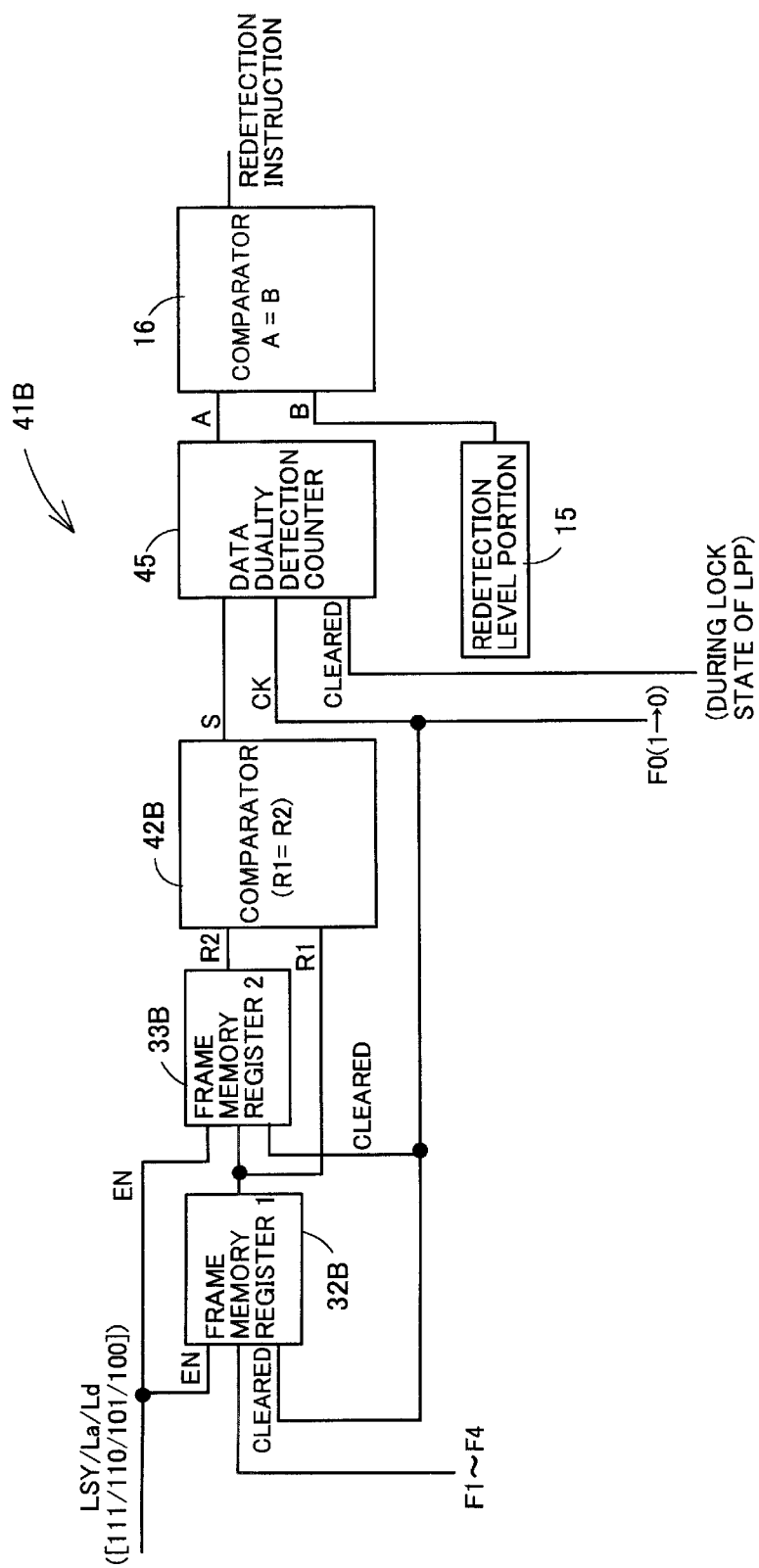
FIG. 11 is a circuit block diagram of a data duality detecting portion according to a second concrete example of the fourth embodiment of the invention.

A data duality detecting portion 41B according to a second concrete example of the fourth embodiment shown in FIG. 11 has the frame memory register 1 (32B) and the frame memory register 2 (33B) as employed in the first concrete example of the third embodiment. An output signal R1 of the frame memory register 1 (32B) and an output signal R2 of the frame memory register 2 (33B) are inputted to a comparator 42B. A comparison result S is outputted from the comparator 42B and inputted to the data duality detection counter 45. The data duality detection counter 45 is identical in configuration to that of the first concrete example and thus will not be described below.

The data duality detecting portion 41B determines whether or not a synchronous mark LSY ("111", "110") or a data bit signal La/Ld ("100", "101") is correctly detected in a pair of data frames in the Even/Odd regions after detection of a synchronous mark LSY by the synchronous mark detecting portion 103 and the start of counting operations of the frame counter 106 and the frame length counter 107. That is, the data duality detecting portion 41B makes use of the fact that a data bit signal La/Ld or the like is recognized in a certain one of data frames in the Even/Odd regions among the respective pairs of data frames if synchronization is attained properly.

An operation in which count values of the four low order bits F1 to F4 of the frame counter 106 at the time when two adjacent data bit signals La/Ld or the like are inputted as activation signals to the enable terminals EN are sequentially set in the frame memory register 1 (32B) and the frame memory register 2 (33B) is identical to the operation of the second concrete example of the third embodiment. As a clear signal, a signal that is activated at a timing for termination of a pair of data frames in the Even/Odd regions, i.e. at a timing for transition of the Even/Odd identification signal F0 from 1 to 0 is inputted to the frame memory register 1 (32B) and the frame memory register 2 (33B). Upon receiving this clear signal, the frame memory register 1 (32B) and the frame memory register 2 (33B) are preset at mutually different values. This is because the comparator 42B does not detect coincidence even if neither the frame memory register 1 (32B) nor the frame memory register 2 (33B) is in operation due to lack of data.

If the count values R1, R2 corresponding to the adjacent data bit signals La/Ld or the like are compared by the comparator 42B, a distance between data frames in which the adjacent data bit signals La/Ld or the like are stored is calculated. It is because a unit of data bit signal La/Ld or the like is stored with two data frames in the Even/Odd regions defined as a pair that the least significant bit F0 of the frame counter 106 is excluded from the comparing processing. Mathematically this corresponds to division of a count value of the frame counter 106 by two.

If the count values R1, R2 coincide with each other (R1=R2) as a result of comparison, it is indicated that the data bit signals La/Ld or the like are detected by count values corresponding to both the data frames in the Even/Odd regions constituting one unit storage region. Dual existence of the adjacent data bit signals La/Ld or the like in the same unit storage region is detected, and a deviation in synchronization is confirmed.

As described above, the LPP access portion 4 of the fourth embodiment has a synchronous mark LSY or a data bit signal La/Ld as a control information unit stored in a pair of data frames in the Even/Odd regions constituting a unit storage region. Therefore, a deviation in frame management can be confirmed if a relation between a data bit signal La/Ld or the like and the unit storage region is confirmed by a count value of the frame counter 106 as an identifier corresponding to the detected data bit signal La/Ld or the like.

If two or more data bit signals La/Ld or the like are detected in one unit storage region by count values corresponding to the detected data bit signals La/Ld or the like, a deviation in frame management can be confirmed.

Further, if the sameness of corresponding unit storage regions is confirmed by count values corresponding to data bit signals La/Ld or the like, a deviation in frame management can be confirmed.

Furthermore, the frequency in this instance can be confirmed by counting the number of times of detection. By merely changing a predetermined count value for triggering an operation of redetection, the timing for the operation of redetecting a synchronous mark LSY as a specific control information unit can be changed.

Because this confirmation can be carried out through detection between adjacent data bit signals La/Ld or the like, it is possible to quickly and reliably detect a deviation in frame management and accurately reproduce a control information string. Thus, recuperation from the deviation in frame management is accelerated and a considerable contribution to enhancement of TAT in access of LPP information is made.

Figure 12:
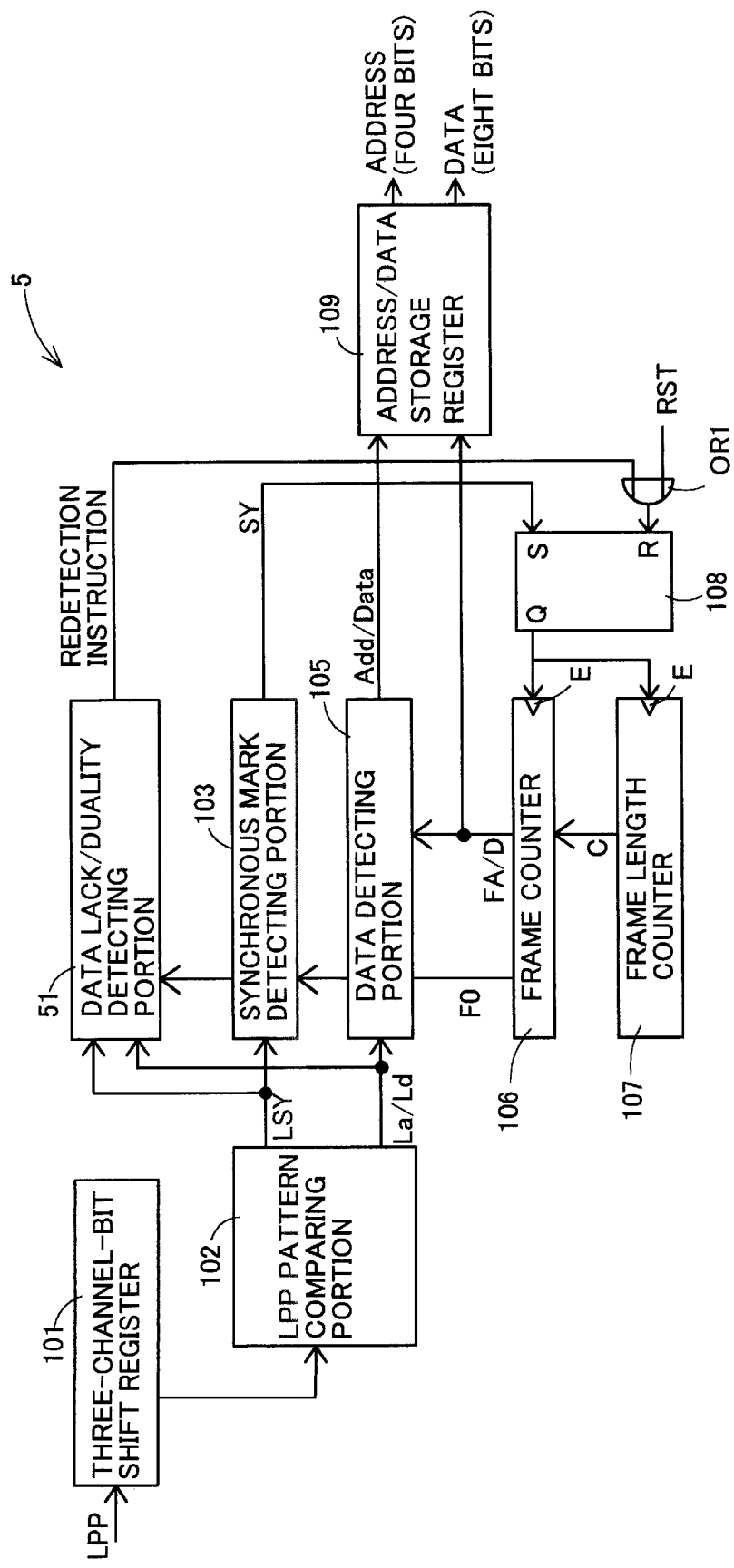
FIG. 12 is a circuit block diagram of an LPP access portion according to a fifth embodiment of the invention.

An LPP access portion 5 of the fifth embodiment shown in FIG. 12 has a data lack/duality detecting portion 51 in addition to the LPP access portion 1000 of the related art shown in FIG. 19. A synchronous mark LSY and a data bit signal La/Ld detected by the LPP pattern comparing portion 102 and an Even/Odd identification signal F0 that is the least significant bit of the frame counter 106 are inputted to the data lack/duality detecting portion 51. As an output signal, a redetection instruction signal is outputted as a result of lack/duality of data. The redetection instruction signal is inputted to the reset input R of the SRFF 108 together with a reset signal RST via the OR gate OR1. The other components are identical in configuration to the LPP access portion 1000 of the related art and thus will not be described herein.

A series of basic operations that are performed in the LPP access portion 1 of the first embodiment and that are identical to those performed in the LPP access portion 1000 of the related art are also performed in the LPP access portion 5 of the fifth embodiment.

An LPP access portion 5 of the fifth embodiment has a data lack/duality detecting portion 51, which improves the quality of access of LPP information by outputting a redetection instruction signal if lack or duality of data is detected due to a deviation in frame management and if a state of lack/duality of data is detected subsequently, i.e. if a state of lack/duality of data is detected in succession.

Figure 13:
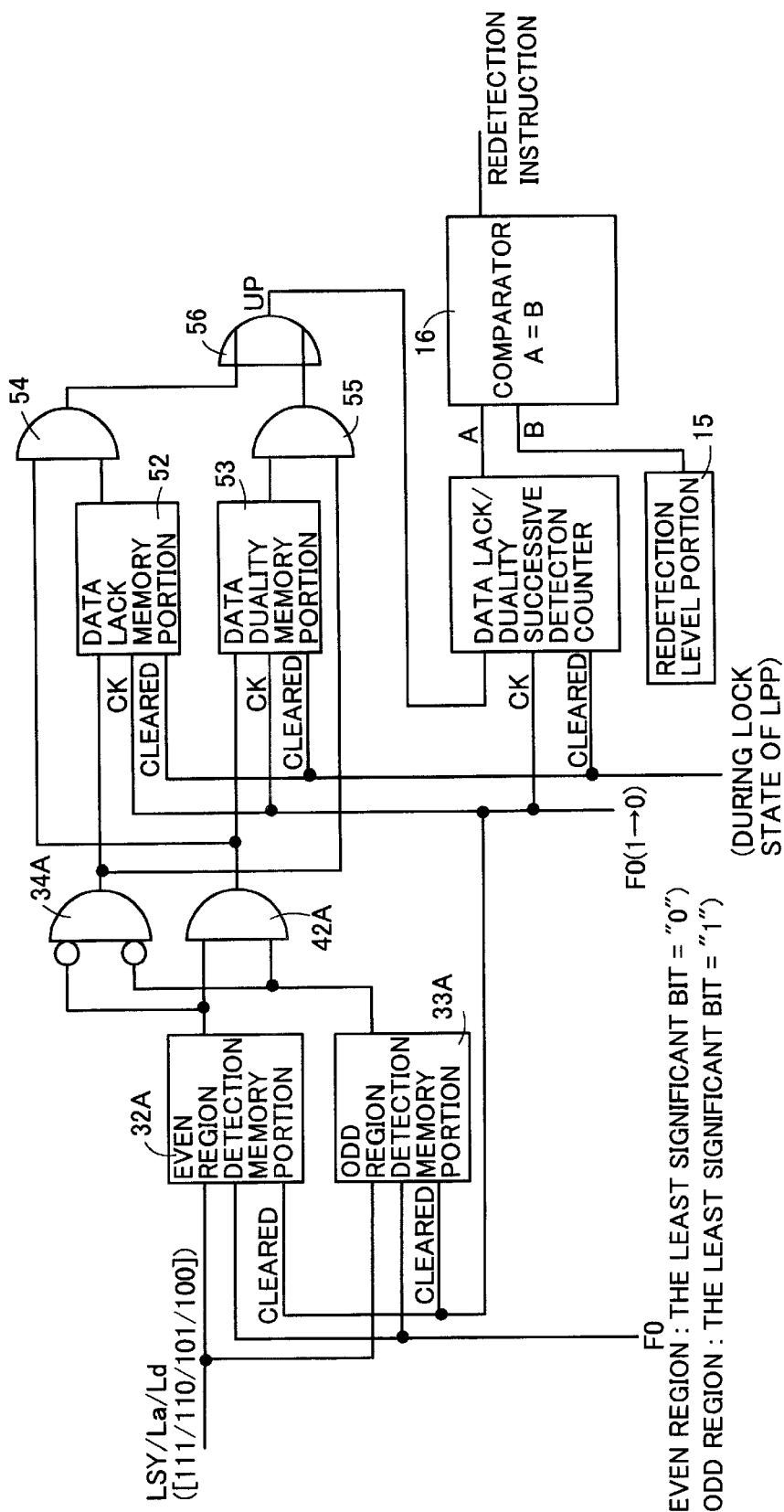
FIG. 13 is a circuit block diagram of a data lack/duality detecting portion according to the fifth embodiment of the invention.

A data lack/duality detecting portion shown in FIG. 13 has the Even region detection memory portion 32A, the Odd region detection memory portion 33A and the logic gate 34A as employed in the configuration of the first concrete example of the third embodiment, and the Even region detection memory portion 32A, the Odd region detection memory portion 33A and the logic gate 42A as employed in the configuration of the first concrete example of the fourth embodiment. Outputs from the logic gates 34A, 42A are inputted to a data lack memory portion 52 and a data duality memory portion 53 as a result of lack and duality of data respectively. Besides, a signal indicating a timing for transition of the Even/Odd identification signal F0 as a clock signal CK and a signal indicating transition to a lock state through access of LPP information as a clear signal are inputted to the data lack memory portion 52 and the data duality memory portion 53. Furthermore, a logic gate 54 that calculates the logical AND between the logic gate 42A and an output signal from the data lack memory portion 52, and a logic gate 55 that calculates the logical AND between the logic gate 34A and an output signal from the data duality memory portion 53 are provided. These output signals are turned into an OR signal via a logic gate 56, and a count-up signal UP is outputted as the OR signal.

The count-up signal UP is inputted to a data lack/duality successive detection counter 57. The data lack/duality successive detection counter 57 uses, as a clock signal CK, a timing for termination of a pair of data frames in the Even/Odd regions in which one LPP information unit is stored, i.e. a timing for transition of the Even/Odd identification signal F0 from 1 to 0, counts the number of outputted count-up signals UP, and outputs the result as a count signal A. As a clear signal of the count value, a signal indicating transition to a lock state through access of LPP information is inputted.

The data lack/duality detecting portion 51 determines whether or not lack and duality of data of a synchronous mark LSY ("111", "110") or a data bit signal La/Ld ("100", "101") are detected in succession in a pair of data frames in the Even/Odd regions after detection of a synchronous mark LSY by the synchronous mark detecting portion 103 and the start of counting operations of the frame counter 106 and the frame length counter 107. The data lack/duality detecting portion 51 makes use of the fact that a data bit signal La/Ld or the like is recognized in a certain one of data frames in the Even/Odd regions among the respective pairs of data frames if synchronization is attained properly.

For example, the following case will be considered in relation to three adjacent unit storage regions. In this case, a data bit signal La/Ld or the like is stored in a data frame in the Odd region of the first unit storage region, in a data frame in the Even region of the second unit storage region, and in a data frame in the Odd region of the third unit storage region. In the case where there is a deviation in frame management for this state and where the Even region and the odd region are recognized reversely, i.e. in the case where the Odd region of the first unit storage region is recognized as the Even region, if data bit signals La/Ld or the like are detected in accordance with successive counter values of the frame counter 106, the Odd region of the first unit storage region and the Even region of the second unit storage region are recognized as one unit storage region so that dual storage of data is detected. Then, the Odd region of the second unit storage region and the Even region of the third unit storage region are recognized as one unit storage region so that lack of data is detected. If data bit signals La/Ld or the like are stored in a certain state, lack and duality of data may be detected in this order.

The above detection result is stored in the data lack memory portion 52 and the data duality memory portion 53. It is then confirmed whether or not similar detection is carried out in a unit storage region adjacent to one in which this memory result has been obtained. To be more specific, the logical AND between a result of the data lack memory portion 52 and a result of detection of duality of data from the logic gate 42A is calculated by the logic gate 54. To the contrary, the logical AND between a result of the data duality memory portion 53 and a result of detection of lack of data from the logic gate 34A is calculated by the logic gate 55. The logical OR of both calculation results is used as a count-up signal UP, whereby a deviation in frame management is detected.

The data lack/duality successive detection counter 57 is provided to improve authenticity of detection. In consideration of bit errors or the like of inputted LPP information as well as the fact that predetermined bit errors are detected and corrected, the data lack/duality successive detection counter 57 acknowledges authentic deviation in synchronization if detection has been carried out a predetermined number of times. Accordingly, even if counting has been carried out erroneously, the contents of the data lack/duality successive detection counter 57 are cleared in the case of transition to a lock state through access of LPP information.

As described above, in the LPP access portion 5 of the fifth embodiment, if there is a deviation in frame management, a unit storage region in which two or more data bit signals La/Ld or the like exist and a unit storage region in which no data bit signal La/Ld or the like exists are adjacent to each other due to count values of the frame counter 106, which are identifiers corresponding to synchronous marks LSY or data bit signals La/Ld as adjacent control information units. Therefore, a deviation in frame management can be detected easily and reliably.

Figure 14:
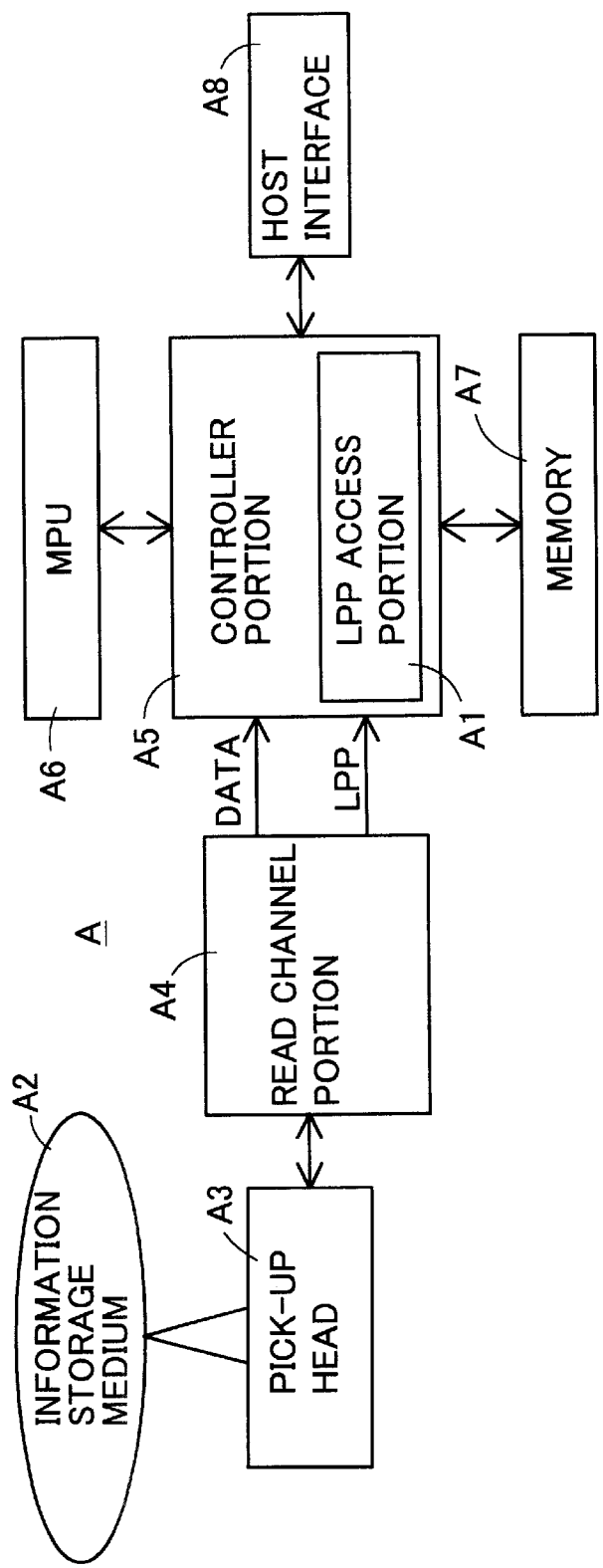
FIG. 14 is a structural diagram of an information storage medium access system equipped with the LPP access portion of the fifth embodiment of the invention.
Figure 17:
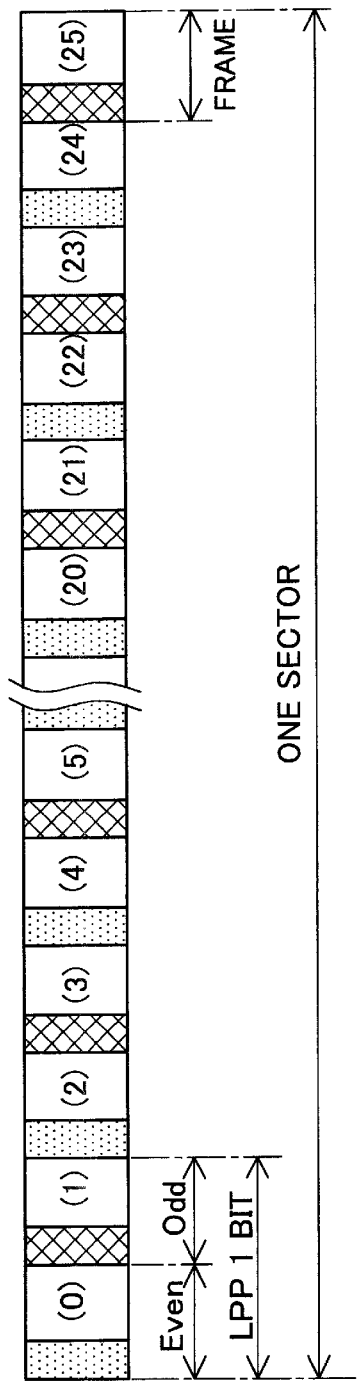
FIG. 17 is a conceptual view of a track format on one data sector.
Figure 18:
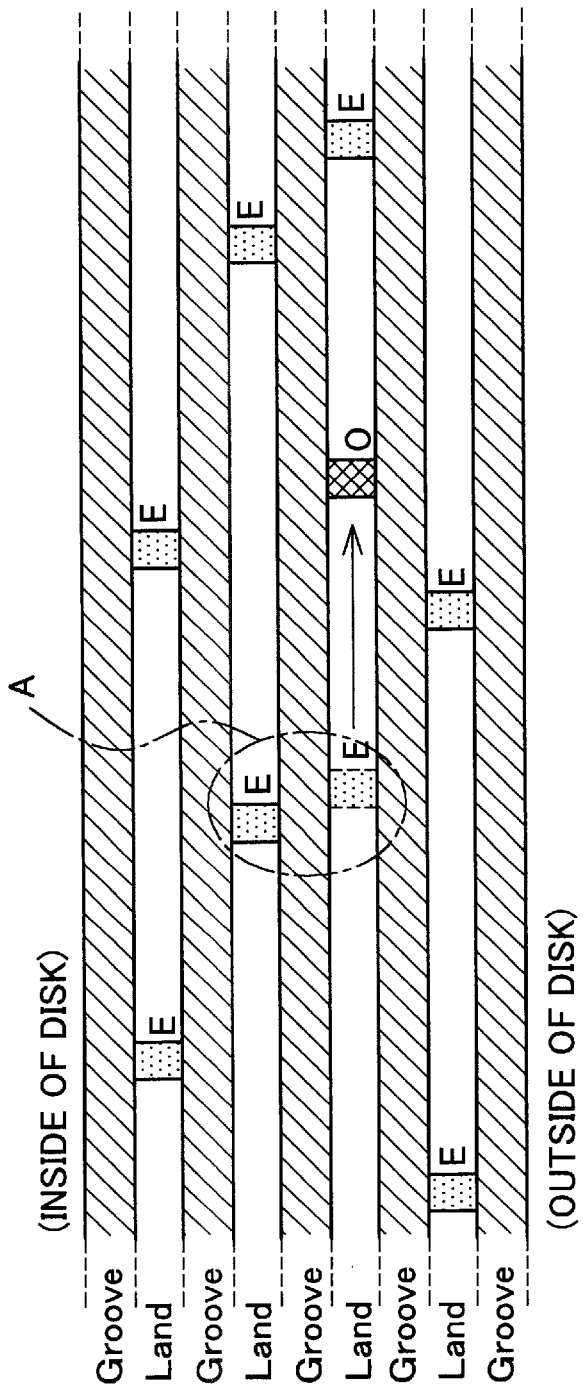
FIG. 18 is a conceptual view of an example of arrangement of LPP on an information storage medium.

FIG. 14 is a structural diagram of an information storage medium access system A that is equipped with one of the LPP access portions 1 to 5 of the first to fifth embodiments as an LPP access portion A1. The information storage medium access system A has an information storage medium A2, a pick-up head A3, a read channel portion A4, a controller portion A5 as a means for receiving information, a microprocessor unit (MPU) A6, a memory A7 and a host interface A8.

For example, a DVD-R into which information can be written, a DVD-RW in which information is rewritable, or the like can be eligibly employed as the information storage medium A2. In addition to audio data or image data, LPP information as information for detection of synchronization is stored on these media. The pick-up head A3 can retrieve data from the information storage medium A2, perform signal processings, and output a signal to the read channel portion A4. The read channel portion A4 transfers data and LPP information to the controller portion A5. The microprocessor unit A6 controls the controller portion A5 and the like while using the memory A7, and transfers data to the host interface A8. Since it is necessary to attain synchronization of detection of data prior to access thereof, access of LPP information needs to be carried out. The LPP access portion A1 is configured as a part of the controller portion A5 and performs access control of LPP information outputted from the read channel portion A4.

The LPP access portion A1 can be realized with a configuration according to one of the first to fifth embodiments. As regards a mode of configuration, the LPP access portion A1 can be configured either as a hardware composed of a combination of electronic circuit components or as a software performing the procedure of access operation as a series of data processings. In the latter case, processing programs, arithmetic results and the like, which are stored in the memory A7, are retrieved when occasion demands. Then arithmetic processings can be performed in an MPU (A6) or an arithmetic processing processor such as a DSP or the like configured in the controller portion A5.

It goes without saying that the invention should not be limited to the first to fifth embodiments and that various improvements and modifications are possible without departing from the spirit and scope of the invention.

For instance, although the unit storage region has been described as a pair of data frames in the Even/Odd regions in the above embodiments, the invention should not be limited thereto. The invention is also applicable to a case where three or more data frames constitute one unit storage region.

Further, the first to fifth embodiments of the invention are designed such that a redetection instruction signal is outputted if the redetection level portion 15 reaches a predetermined count value of erroneous detection. However, the predetermined count value may also be one. Namely, a redetection instruction signal may be outputted immediately once erroneous detection has been performed.

The invention makes it possible to provide an information access device and an information storage medium access system which can accurately reproduce a control information string by quickly and reliably detecting a deviation in frame management associated with erroneous detection of a synchronous mark and performing an operation of redetecting a synchronous mark in the course of access of control information on an information storage medium.

What is claimed is:

1. An information access device for reading control information from an information storage device, the control information recorded on a plurality of data frames including at least a first data frame and a second data frame, the information access device comprising:
    a detection circuit for detecting a control information from the first data frame or the second data frame;
    an error detection circuit for detecting the control information indicating the second data frame from a region where the first data frame is positioned and outputting an error signal: and
    a reset circuit for generating a reset signal to re-detect a control information based on the error signal.

2. The information access device according to claim 1 further comprising a frame counter for counting a number of frame data until reaching to a predetermined number, wherein the reset circuit resets the frame counter based on the reset signal.

3. The information access device according to claim 1 further comprising a frame counter for counting a number of frame data and supplying an identification signal indicating the first region or the second region.

4. The information access device according to claim 1 further comprising:
    a data detection circuit for detecting data from the plurality at data frames; and
    a storage circuit for storing the detected data.

5. The information access device according to claim 1, wherein the first data frames and the second data frames are provided alternately.

6. The information access device according to claim 1, wherein the error detection circuit comprises:
    a first detection circuit for detecting the control information indicating the first data frame from a second region where the second data frame is positioned and outputting a first count signal;
    a second detection circuit for detecting the control information indicating the second data frame from a first region where the first data frame is positioned and outputting a second count signal; and
    a detection counter for counting the first count signal or the count error signal.

7. The information access device according to claim 6, wherein the error detection circuit comprises a comparator for comparing the counted number with a predetermined count number and outputting the error signal when the counted number reached the predetermined count number.

8. An information access device for reading control information from an information storage device, the control information recorded on a plurality of data frames including at least a first data frame in a first region and a second data frame in a second region, the first data frame and the second date frame having a control information and data, the information access device comprising:
    a detection circuit for detecting the control information and the data from the first data frame or the second data frame;
    a data detection circuit for detecting the data from the second region end outputting a re-detection signal; and
    a reset circuit for generating a reset signal for re-detecting a control information based on the re-detection signal.

9. The information access device according to claim 8, further comprising a frame counter for counting a number of frame data and supplying an identification signal indicating the first region or the second region.

10. The information access device according to claim 8, wherein the first data frames and the second data frames are provided alternately.

11. The information access device according to claim 9, wherein the data detection circuit comprises:
    a first data detection circuit for detecting the data based on the identification signal and outputting a count signal; and
    a detection counter for counting the count signal.

12. The information access device according to claim 11, wherein the data detection circuit comprises a comparator for comparing the counted number with a predetermined count number and outputting the re-detection signal when the counted number reached to the predetermined count number.

13. An information access device for reading control information from an information storage device, the control information recorded on a plurality of data frames including at least a first data frame in a first region and a second data frame in a second region, the first data frame and the second data frame having a control information and data, the information access device comprising:

a detection circuit for detecting the control information and the data from the first data frame or the second data frame;

a lack detection circuit for detecting a lack of at least one of the control information and the data from the first region or the second region and outputting a re-detection signal: and a reset circuit for generating a reset signal for re-detecting a control information based on the re-detection signal.

14. The information access device according to claim 13, further comprising a frame counter for counting a number of frame data and supplying an identification signal indicating the first region or the second region.

15. The information access device according to claim 13, wherein the first data frames and the second data frames are provided alternately.

16. The information access device according to claim 13, wherein the lack detection circuit comprises:

a first lack detection circuit for detecting the lack of at least one of the control information and the data from the first region and outputting a first lack detection signal:

a second lack detection circuit for detecting the lack of at least one of the control information and the data from the second region and outputting a second lack detection signal;

a logic circuit for calculating the first lack detection signal and the second lack detection signal and outputting a count signal: and a lack detection counter for counting the count signal.

17. The information access device according to claim 16, wherein the lack detection circuit comprises a comparator for comparing the counted number with a predetermined count number and outputting the re-detection signal when the counted number reached to the predetermined count number.

18. The information access device according to claim 13, wherein the first lack detection circuit, the second lack detection circuit and the lack detection counter work on a clock signal which is transmitted in accordance with a transition between the first data frame and the second data frame.

19. The information access device according to claim 13, wherein the lack detection circuit comprises:

a first frames register for storing a portion of a number of data frames in accordance with the control information or the data and outputting a first signal;

a second frame register far storing the outputted signal from the first register in accordance with the control information or the data and outputting a second signal;

a subtracter for subtracting the second signal from the first signal and outputting a count signal; and a lack detection counter for counting the count signal.

20. The information access device according to claim 19, wherein the lack detection circuit comprises a comparator for comparing the counted number with a predetermined count number and outputting the re-detection signal when the counted number reached to the predetermined count number.

21. The Information access device according to claim 13, wherein the lack detection circuit comprises:

a frame register for storing a portion of a number of data frames in accordance with the control information or the data and outputting a signal;

a comparator for comparing the signal with a initial value and outputting a count signal; and a lack detection counter for counting the count signal.

22. The information access device according to claim 21, wherein the lack detection circuit comprises a comparator for comparing the counted number with a predetermined count number and outputting the re-detection signal when the counted number reached to the predetermined count number.

23. An information access device for reading control information from an information storage device, the control information recorded on a plurality of data frames including at least a first data frame in a first region and a second data frame in a second region, the first data frame and the second data frame having a control information and data, the information access device comprising:

a detection circuit for detecting the control information and the data from the first data frame or the second data frame;

a duality detection circuit for detecting at least one of the control Information and the data from both of the first region and the second region and outputting a re-detection signal; and a reset circuit for generating a reset signal for re-detecting a control information and data based on the re-detection signal.

24. The information access device according to claim 23 further comprising a frame counter for counting a number of frame data and supplying an identification signal indicating the first region or the second region.

25. The information access device according to claim 23, wherein the first data frames and the second data frames are provided alternately.

26. The information access device according to claim 23, wherein the duality detection circuit comprises:

a first duality detection circuit for detecting at least one of the control information and the data from the first region and outputting a first duality detection signal;

a second duality detection circuit for detecting at least one of the control information and the data from the second region and outputting a second duality detection signal;

a logic circuit for calculating the first duality detection signal and the second duality detection signal and outputting a count signal; and a duality detection counter for counting the count signal.

27. The information access device according to claim 26, wherein the duality detection circuit comprises a comparator for comparing the counted number with a predetermined count number arid outputting the re-detection signal when the counted number reached to the predetermined count number.

28. The information access device according to claim 26, wherein the first duality detection circuit, the second duality detection circuit and the duality detection counter work on a clock signal which is transited in accordance with a transition between the first data frame and the second data frame.

29. The information access device according to claim 23, wherein the duality detection circuit comprises:

a first frame register for storing a portion of a number of data frames in accordance with the control information or the data and outputting a first signal;

a second frame register for storing the outputted signal from the first register in accordance with the control information or the data and outputting a second signal;

a comparator for comparing the first signal with the second signal and outputting a count signal: and a duality detection counter for counting the count signal.

30. The information access device according to claim 29, wherein the duality detection circuit comprises:

a comparator for comparing the counted number with a predetermined count number and outputting the re-detection signal when the counted number reached to the predetermined count number.

31. An information access method for reading control information from an information storage media, comprising:

a step of receiving a control information and an identification signal which indicates a region where the control information is positioned;

a step of comparing the control information with the identification signal; and a step of re-reading the control information based on the comparison result.

32. An information access method for reading data including a plurality of sectors having even frames and odd frames which are attributed to one of an even region and odd region, comprising:

a step of receiving a control information from a region;

a step of comparing the control information with an identification signal which indicates the attribution of the region; and a step of re-reading the control information based on the detecting result.

33. A data access device for accessing data including a plurality of sectors which have even frames and odd frames, the data access device comprising:

a synchronous mark detector for outputting a first value when detecting a synchronous mark corresponding to even frame and outputting a second value when detecting a synchronous mark corresponding to odd frame;

a frame counter outputting a third value indicating either the even or the odd frame;

an even synchronous mark detector receiving the first value and the third value, comparing the first value and the third value and outputting the first comparison result; and an odd synchronous mark detector receiving the second value and the third value, comparing the second value and third value and outputting the second comparison result, wherein the synchronous mark is re-reading based on the first comparison result and the second comparison result.

34. An information access method for reading control information from an information storage device, the control information recorded on a plurality of data frames including at least a first data frame and a second data frame, the information access method comprising:

a step of detecting a control information from the first data frame or the second data frame;

a step of outputting an error signal for detecting the control information indicating the second data frame from a region where the first data frame is positioned; and a step of generating a reset signal to re-detect a control information based on the error signal.

35. An information access method for reading control information from an information storage device, the control information recorded on a plurality of data frames including at least a first data frame in a first region and a second data frame in a second region, the first data frame and the second data frame having a control information and data, the information access method comprising:

a step of detecting the control information and the data from the first data frame or the second data frame;

a step of outputting a re-detection signal for detecting the data from the second region; and a step of generating a reset signal for re-detecting a control information based on the re-detection signal.

36. An information access method for reading control information from an information storage device, the control information recorded on a plurality of data frames including at least a first data frame in a first region and a second data frame in a second region, the first data frame and the second data frame having a control information and data, the information access method comprising:

a step of detecting the control information and the data from the first data frame or the second data frame;

a step of outputting a re-detection signal for detecting a lack of at least one of the control information and the data from both of the first region or the second region; and a step of generating a reset signal for re-detecting a control information based on the re-detection signal.

37. An information access method for reading control information from an information storage device, the control information recorded on a plurality of data frames including at least a first data frame in a first region and a second data frame in a second region, the first data frame and the second data frame having a control information and data, the information access method comprising:

a step of detecting the control information and the data from the first data frame or the second data frame;

a step of outputting a re-detection signal for detecting at least one of the control information and the data from both of the first region and the second region; and a step of generating a reset signal for re-detecting a control information and data based on the re-detection signal.

* * * * *